United States Patent
Galitsky

(10) Patent No.: US 11,989,525 B2
(45) Date of Patent: May 21, 2024

(54) TECHNIQUES FOR GENERATING MULTI-MODAL DISCOURSE TREES

(71) Applicant: Oracle International Corporation, Redwood Shores, CA (US)

(72) Inventor: Boris Galitsky, San Jose, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 276 days.

(21) Appl. No.: 17/695,653

(22) Filed: Mar. 15, 2022

(65) Prior Publication Data

US 2022/0318517 A1    Oct. 6, 2022

Related U.S. Application Data

(60) Provisional application No. 63/166,568, filed on Mar. 26, 2021.

(51) Int. Cl.
*G06F 40/35*    (2020.01)
*G06F 40/295*   (2020.01)
(Continued)

(52) U.S. Cl.
CPC ............ *G06F 40/35* (2020.01); *G06F 40/295* (2020.01); *G06N 20/00* (2019.01); *G06F 3/0482* (2013.01)

(58) Field of Classification Search
CPC ...... G06F 40/35; G06F 40/295; G06F 3/0482; G06N 20/00; G06N 5/046
See application file for complete search history.

(56) References Cited

U.S. PATENT DOCUMENTS 11,783,126 B2 * 10/2023 Galitsky ............... G06N 3/006
                                              704/9
2014/0096249 A1    4/2014 Dupont et al.
(Continued)

FOREIGN PATENT DOCUMENTS

WO    WO-9921106 A1 *  4/1999 ........... G06F 17/274
WO    2019067869         4/2019

OTHER PUBLICATIONS

International Application No. PCT/US2022/020420, International Search Report and Written Opinion dated Jun. 7, 2022, 8 pages.
(Continued)

*Primary Examiner* — Abul K Azad
(74) *Attorney, Agent, or Firm* — Kilpatrick Townsend & Stockton LLP

(57) ABSTRACT

Methods for generating and utilizing a multi-modal discourse tree (MMDT) are provided herein. An extended discourse tree (EDT) may be generated (e.g., from a discourse tree (DT) or a communicative DT (CDT)) from a corpus of text. Data records (e.g., records contained numerical data) may be linked to the extended discourse tree to generate a multi-modal discourse tree. The multi-modal discourse tree may link any suitable text/records from disparate sources. For example, entities identified from elementary discourse units of the EDT may be matched to an entity of a data record. Causal links may be identified between EDTs and/or data records. Rhetorical relationships can be identified for each entity/causal link match to incorporate the data records with the EDT to generate a MMDT. The MMDT may be used to classify subsequent input, to generate answers to subsequent questions, to navigate the corpus of text and/or data records, or the like.

20 Claims, 13 Drawing Sheets

(51) Int. Cl.
    *G06N 20/00*     (2019.01)
    *G06F 3/0482*     (2013.01)

(56) References Cited

U.S. PATENT DOCUMENTS

| | | | |
|---|---|---|---|
| 2014/0172919 A1 | 6/2014 | Johnston et al. | |
| 2018/0082183 A1* | 3/2018 | Hertz | G06Q 10/10 |
| 2018/0357220 A1* | 12/2018 | Galitsky | G06F 40/30 |

OTHER PUBLICATIONS

Aboul-Enein, Discourse Analysis of Legal Discourse with Reference to Dickens, Cozzens, Kafka, Lee, and Melville, PhD Thesis, Jan. 1999, 1 page.

Amgoud et al., Representing and Reasoning about Arguments Mined from Texts and Dialogues, 13th European Conference, ECSQARU 2015, Jul. 2015, 10 pages.

Apotheloz et al., The Function of Negation in Argumentation, Journal of Pragmatics, vol. 19, Jan. 1993, pp. 23-38.

Galitsky et al., A Novel Approach for Classifying Customer Complaints Through Graphs Similarities in Argumentative Dialogues, Decision Support Systems, vol. 46, No. 3, Feb. 2009, pp. 717-729.

Galitsky et al., Chat bot with a Discourse Structure-Driven Dialogue Management, Proceedings of the Software Demonstrations of the 15th Conference of the European Chapter of the Association for Computational Linguistics, Jan. 2017, pp. 87-90.

Galitsky, Chatbots for CRM and Dialogue Management, In Artificial Intelligence for Customer Relationship Management: Solving Customer Problems, Springer, Jan. 2021, pp. 1-61.

Galitsky et al., Concept-Based Learning of Human Behavior for Customer Relationship Management, Information Sciences, vol. 181, No. 10, May 15, 2011, pp. 2016-2035.

Galitsky, Discourse-Level Dialogue Management, In Developing Enterprise Chatbots: Learning Linguistic Structures, Springer Nature, 2019, pp. 365-387.

Galitsky et al., Improving Web Search Relevance with Learning Structure of Domain Concepts, Clusters, Orders, and Trees: Methods and Applications, May 2014, 37 pages.

Galitsky, Recognizing Abstract Classes of Text Based on Discourse, In Artificial Intelligence for Customer Relationship Management: Keeping Customers Informed, 2021, pp. 379-414.

Galitsky, Transfer Learning of Syntactic Structures for Building Taxonomies for Search Engines, Engineering Applications of Artificial Intelligence, vol. 26, No. 10, Nov. 2013, 32 pages.

Galitsky et al., Using Generalization of Syntactic Parse Trees for Taxonomy Capture on the Web, Proceedings of the 19th International Conference on Conceptual Structures, ICCS, Jul. 2011, pp. 104-117.

Galitsky et al., Validating Correctness of Textual Explanation With Complete Discourse Trees, Proceedings of the 7th International Workshop "What can FCA do for Artificial Intelligence"?, co-located with International Joint Conference on Artificial Intelligence, 2019, 9 Pages.

Goldberg et al., A Bi-Directional Adversarial Explainability for Decision Support, Human-Intelligent Systems Integration, 2021, pp. 1-14.

Gomez et al., Reasoning With Inconsistent Ontologies Through Argumentation, Applied Artificial Intelligence. vol. 24, Issue 1-2, Feb. 2010, pp. 102-148.

Grasso, Playing with RST: Two Algorithms for the Automated Manipulation of Discourse Trees, Text, Speech and Dialogue: Second International Workshop, TSD'99 Plzen, Czech Republic, Lecture Notes in Computer Science, vol. 1692, Jan. 1999, pp. 357-360.

Ilvovsky et al., Controlling Chat Bot Multi-Document Navigation with the Extended Discourse Trees, 4th International Conference on Computational Linguistics in Bulgaria (CLIB), Jun. 2020, pp. 63-71.

Ilvovsky et al., Dialogue Management Using Extended Discourse Trees, Dialogue-Russian Conference on Computational Linguistics, Jun. 2020, pp. 361-371.

Marcu et al., An Unsupervised Approach to Recognizing Discourse Relations, Proceedings of the 40th Annual Meeting of the Association for Computational Linguistics (ACL), Jul. 2002, 8 pages.

Marcu, The Rhetorical Parsing of Unrestricted Texts: A Surface-Based Approach, Computational Linguistics, vol. 26, No. 3, Sep. 2000, pp. 395-448.

Sporleder et al., Combining Hierarchical Clustering and Machine Learning to Predict High-Level Discourse Structure, In Proceedings of the 20th international conference on Computational Linguistics, COLING '04, Aug. 2004, 7 pages.

Zhang et al., An Interpretable Deep Learning Model for Early Prediction of Sepsis in the Emergency Department, medRxiv, 100196, vol. 2, No. 2, Sep. 23, 2020, pp. 1-9.

\* cited by examiner

TECHNIQUES FOR GENERATING MULTI-MODAL DISCOURSE TREES

CROSS-REFERENCES TO RELATED APPLICATIONS

This application claims the benefit of U.S. Provisional Application No. 63/166,568 filed Mar. 26, 2021, entitled "Multimodal Discourse Tree for Health Management and Security," the contents of which is incorporated herein, in its entirety, for all purposes.

TECHNICAL FIELD

This disclosure is generally concerned with linguistics. More specifically, this disclosure relates to generating and utilizing Multi-Modal Discourse Trees MMDT (e.g., to classify input text, to generate an answer to a question, to navigate text, etc.).

BACKGROUND

Computer-implemented applications of linguistics are increasing due to the greatly increased speed of processors and capacity of memory. For example, computer-based analysis of language discourse facilitates numerous applications, such as automated agents that can answer questions received from user devices or machine-learning applications that can classify input. In these, and other contexts, current systems may provide textual data and potentially related numerical data (e.g., logs, maps, data records, and the like) separately. In some cases, it can be beneficial to utilize both text and various potentially related numerical data to classify similar data and/or to answer subsequent, related questions. However, such data is difficult to combine in a meaningful way.

BRIEF SUMMARY

Techniques are disclosed for generating and utilizing Multi-Modal Discourse Trees (MMDTs) (e.g., to classify input text, to generate an answer to a question, to navigate text, etc.).

In some embodiments, a computer-implemented method for generating Multimodal Discourse Trees (e.g., to classify input, to navigate text, to identify answers to subsequent questions, etc.) is disclosed. The method may comprise obtaining a corpus of text and one or more data records that are separate from the corpus of text. The method may further comprise generating an extended discourse tree for the corpus of text. In some embodiments, the extended discourse tree comprises a plurality of discourse trees. Each discourse tree may comprise a plurality of nodes, each terminal node of the discourse tree corresponding to a fragment of text, each non-terminal node of the discourse tree indicating a rhetorical relationship between nodes of the discourse tree. In some embodiments, the extended discourse tree comprises additional links between the plurality of discourse trees indicating additional rhetorical relationships between nodes of respective discourse trees. The method may further comprise identifying entity matches between a set of elementary discourse units of the plurality of discourse trees and the one or more data records. In some embodiments, the entity matches may be identified by comparing a first entity identified from an elementary discourse unit to a second entity identified from a data record. The method may further comprise executing a causal link identification algorithm to identify one or more causal links between two data records of the one or more data record. The method may further comprise determining a corresponding rhetorical relationship for each entity match and each of the one or more causal links identified. The method may further comprise generating, for the extended discourse tree, respective nodes for each entity match and for each causal link identified. The method may further comprise linking the respective nodes generated for each entity match and for each causal link to a respective node of the extended discourse tree based at least in part on the corresponding rhetorical relationship determined, thereby creating a multi-modal discourse tree.

In some embodiments, generating the extended discourse comprises: i) generating a first discourse tree from a first text of the corpus of text, the first discourse tree corresponding to a first portion of the first text, ii) generating a second discourse tree from a second text of the corpus of text, the second discourse tree corresponding to a second portion of the second text; and iii) responsive to determining a particular rhetorical relationship between respective elementary discourse units of the first discourse tree and the second discourse tree, linking the first discourse tree and the second discourse tree using the particular rhetorical relationship.

In some embodiments, the first discourse tree and the second discourse trees are communicative discourse trees comprising respective verb signatures generated for each elementary discourse unit of the first discourse tree and the second discourse tree.

In some embodiments, identifying the entities further comprises comparing the second entity identified from the data record and a third entity identified from a second data record, wherein an entity refers to one of (i) a person, (ii) a company, (iii) a location, (iv) a name of a document, or (v) a date or time.

In some embodiments, identifying the entity matches further comprises identifying the entity from a predefined ontology.

In some embodiments, the method may further comprise classifying subsequent input based at least in part on the multi-modal discourse tree, wherein classifying the subsequent input comprises: i) generating a training data set comprising a plurality of multi-modal discourse trees, each multi-modal discourse tree corresponding to a respective text corpus and a respective set of data records, each multi-modal discourse tree being associated with a label corresponding to a classification; ii) training a machine-learning model to classify input based at least in part on the training data set and a supervised learning algorithm; iii) generating a corresponding multi-modal discourse tree from the subsequent input, the subsequent input comprising a respective set of text and a respective set of data records; and iv) classifying the subsequent input based at least in part on providing the corresponding multi-modal discourse generated from the subsequent input to the machine-learning mode as input and receiving output from the machine-learning model indicating a classification for the subsequent input.

In some embodiments, the method further comprises navigating the corpus of text using the multi-modal discourse tree, wherein navigating the corpus of text comprises: accessing the multi-modal discourse tree; determining, from the multi-modal discourse tree a first elementary discourse unit that is responsive to a query from a user device, the first elementary discourse unit corresponding to a first node of a first discourse tree of the multi-modal discourse tree; determining, from the multi-modal discourse tree, a set of navigation options comprising at least two of: (i) a first rhetorical relationship between the first node of the first discourse tree and a second node of the first discourse tree and (ii) a second rhetorical relationship between the first node and a third node of a second discourse tree of the multi-modal discourse tree, or iii) a third rhetorical relationship between the first node of the first discourse tree and a fourth node of the multi-modal discourse tree that is associated with a corresponding data record; presenting, to the user device, at least two of: the first, second, or third rhetorical relationships; and responsive to receiving additional user input comprising a selection of the first rhetorical relationship, the second rhetorical relationship, or the third rhetorical relationship: i) presenting a second elementary discourse unit corresponding to the second node based at least in part on determining the selection corresponds to the first rhetorical relationship, ii) presenting a third elementary discourse unit corresponding to the third node based at least in part on determining the selection corresponds to the first rhetorical relationship, or 3) presenting at least a portion of the corresponding data record based at least in part on determining the selection corresponds to the third rhetorical relationship.

The exemplary method(s) discussed herein can be implemented on systems and/or devices including one or more processors and/or stored as instructions on a non-transitory computer-readable medium. Various aspects of the present disclosure may be implemented by using a computer program product, comprising computer program/instructions which, when executed by a processor, cause the processor to perform any of the methods disclosed herein.

DETAILED DESCRIPTION

Figure 1:
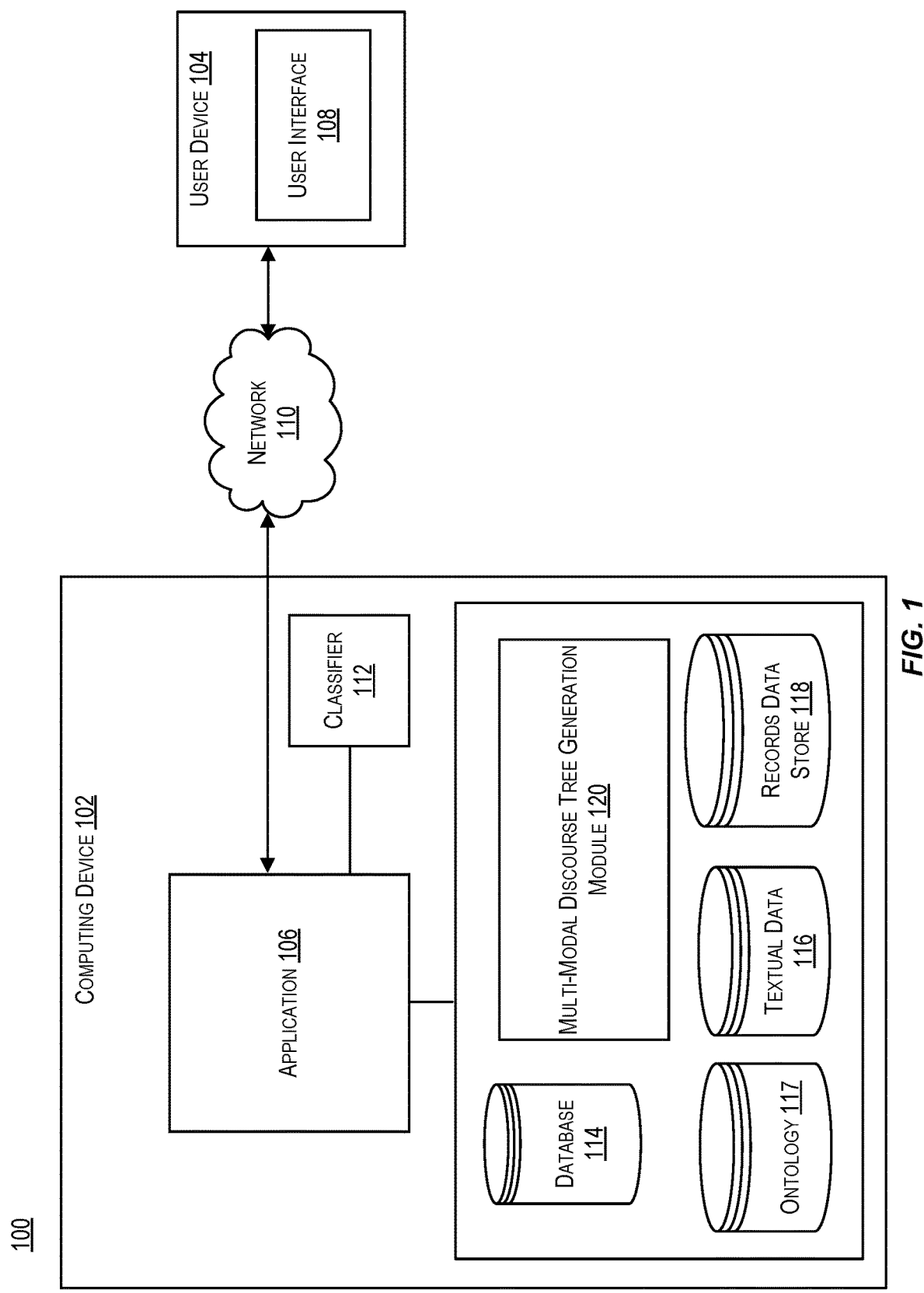
FIG. 1 depicts an example of a computing environment for classifying input using a Multi-Modal Discourse Tree (MMDT), in accordance with at least one embodiment of the present disclosure.

Aspects of the present disclosure relate to generating and utilizing Multi-Modal Discourse Trees (MMDTs) for classifying input. A multimodal discourse tree (MMDT) refers to a discourse tree that includes accompanying data (values, sets, and/or records) that are related to parts (e.g., elementary discourse units) of the discourse tree. The MMDT includes relations between a data set and the discourse tree and relations between data in a given data set. Examples of rhetorical relations (also referred to herein as "rhetorical relationships") that can exist between data values, sets and records include Reason, Cause, Enablement, Contrast, Temporal sequence.

Discourse analysis plays an important role for constructing a logical structure of thoughts expressed in text. Discourse trees are means to formalize textual discourse in a hierarchical manner, specifying rhetorical relations between phrase and sentences (discourse units). Discourse trees (DTs) are a compromise between a complete logical representations like logical forms and informal representations by original text. Learning DTs has found a number of applications in content generation, summarization, machine translation and question answering. The limitation of DT's employment in a general data analysis task is that they are designed to represent discourse of a text rather than a causal relationship between components of an abstract data item.

The techniques disclosed herein utilize discourse analysis to generate a variety of discourse trees from a corpus of text. For example, a discourse tree may be generated for each text of a corpus of documents (e.g., a corpus of relevant/related content). In some embodiments, a discourse trees (DT) may be augmented with communicative actions (e.g., verb signatures) to generate a communicative discourse tree (CDTs). Rhetorical relationships between units (e.g., elementary discourse units) of the CDTs can be identified to generate an extended discourse tree (EDT). The EDT can include a combination of the CDTs with relationships identified between various units of the CDTs and across various granularities (e.g., between sentences of a document, paragraphs of a document, between sentences/paragraphs of different documents, and/or between documents as a whole).

A multi-modal discourse tree (MMDT) can be generated from the EDT by combining the EDT with accompanying numerical data through discourse abstraction and formalizing discourse of not just the text and textual documents of the corpus, but also across various kinds of numerical data. The MMDT may be generated such that the same rhetorical relations that hold between text fragments also hold between data values, set, and records. The MMDT may be a discourse tree that includes accompanying data (values, sets, and/or numerical data records) that are related to parts (e.g., elementary discourse units) of the EDT. The MMDT may be generated to include relations between the accompanying data as well as relations between portions of the accompanying data and portions of the corpus text. The resultant MMDT may then be used to drive automated answers in the area of autonomous agents and/or to classify input. In an example, a discourse tree may be utilized that represents a reasoning structure required to come to a conclusion in a legal case. An extended discourse tree can be generated from the discourse tree and augmented with related information (e.g., data of a particular case), such as phone calls, information about movement of people, transactional records/financial records, and inner relations between the information.

The disclosed techniques improve upon existing solutions by better understanding multiple related sources of information as a whole. MMDTs can be used to extend the abilities of interactive chat bots (e.g., autonomous agent applications). A conventional discourse tree expresses the author's flow of thoughts at the level of paragraph or multiple paragraphs. Conventional discourse trees become fairly inaccurate when applied to larger text fragments, or documents. These discourse trees can be used to generate an extended discourse tree and then a multi-modal discourse tree, that can serve as a representation for the set of inter-connected documents and corresponding data records covering a topic. These MMDTs can be used in a variety of domains (e.g., in the medical field for diagnosis and/or disease prevention, legal case classification to relate a case to a statute, and the like).

Certain Definitions

As used herein, "rhetorical structure theory" is an area of research and study that provided a theoretical basis upon which the coherence of a discourse could be analyzed.

As used herein, "discourse tree" or "DT" refers to a structure that represents the rhetorical relations for a sentence of part of a sentence.

As used herein, a "rhetorical relation," "rhetorical relationship," or "coherence relation" or "discourse relation" refers to how two segments of discourse are logically connected to one another. Examples of rhetorical relations include elaboration, contrast, and attribution.

As used herein, a "sentence fragment," or "fragment" is a part of a sentence that can be divided from the rest of the sentence. A fragment is an elementary discourse unit. For example, for the sentence "Dutch accident investigators say that evidence points to pro-Russian rebels as being responsible for shooting down the plane," two fragments are "Dutch accident investigators say that evidence points to pro-Russian rebels" and "as being responsible for shooting down the plane." A fragment can, but need not, include a verb.

As used herein, "signature" or "frame" refers to a property of a verb in a fragment. Each signature can include one or more thematic roles. For example, for the fragment "Dutch accident investigators say that evidence points to pro-Russian rebels," the verb is "say" and the signature of this particular use of the verb "say" could be "agent verb topic" where "investigators" is the agent and "evidence" is the topic.

As used herein, "thematic role" refers to components of a signature used to describe a role of one or more words. Continuing the previous example, "agent" and "topic" are thematic roles.

As used herein, "nuclearity" refers to which text segment, fragment, or span, is more central to a writer's purpose. The nucleus is the more central span, and the satellite is the less central one.

As used herein, "coherency" refers to the linking together of two rhetorical relations.

As used herein, a "communicative discourse trees" or a "CDT" is a discourse tree that is supplemented with communicative actions. A communicative action is a cooperative action undertaken by individuals based on mutual deliberation and argumentation. Communicative discourse trees therefore combine rhetoric information with communicative actions.

As used herein, "communicative verb" is a verb that indicates communication. For example, the verb "deny" is a communicative verb.

As used herein, "communicative action" describes an action performed by one or more agents and the subjects of the agents.

As used herein, an "entity" has an independent and distinct existence. Examples includes objects, places, and persons. An entity can also be a subject or topic such as "electric cars," "brakes," or "France."

Moving on to the figures, FIG. 1 depicts an example of a computing environment for correcting raw text generated using deep learning techniques, in accordance with at least one embodiment. In the example depicted in FIG. 1, computing environment 100 includes one or more of computing device 102 and user device 104. Computing device 102 can implement an application (e.g., application 106). In some embodiments, the application 106 may be an autonomous agent (e.g., a chatbot) that engages in a conversation with user device 104 and uses one or more of the techniques disclosed herein to dialog in response to input provided by user device 104. As another example, application 106 can be part of a machine-learning component of computing device 102. Application 106 can be configured to generate any suitable number of multi-modal discourse trees (MMDTs) from textual data (e.g., a corpus of textual data obtained from textual data 116) and data records (e.g., numerical data obtained from records data store 118). Examples of computing device 102 are an example of the distributed system 1000 of FIG. 10 and client computing devices 1002, 1004, 1006, and 1008.

User device 104 can be any mobile device such as a mobile phone, smart phone, tablet, laptop, smart watch, and the like. As depicted, user device 104 user interface 108. User interface 108 may be configured to accept input from the user (e.g., via keyboard, microphone inputs, mouse inputs, touch screen, etc.) and provide data corresponding to that input to the computing device 102. In some embodiments, the user interface 108, or another component of the user device 104, may be configured to take vocal input and convert it to text prior to transmitting the text to computing device 102. The user device 104 may be configured to transmit text to the computing device 102. In other embodiments, the text may be obtained using a user interface (not depicted) provided by the computing device 102 and/or from a data store (not depicted) accessible to the computing device 102. Examples of suitable text include electronic text source such as text files, Portable Document Format (PDF)® documents, rich text documents, and the like. In some cases, preprocessing may be performed on the input text to remove unwanted characters or formatting fields. Input text can be organized by using one or more structural or organizational approaches such as sections, paragraphs, pages, and the like.

In some embodiments, user device 104 and computing device 102 may be communicatively connected via network 110. Network 110 can be any suitable public or private network including the Internet, a local area network, a virtual private network, or the like.

In some embodiments, the computing device 102 may include a classifier 112. Classifier 112 may be any suitable machine-learning model trained using training data 114 to provide output (e.g., an answer, generated text, etc.) in response to input (e.g., a question or other data submitted at user interface 108). Training data 114 can include any suitable data (e.g., question/answer pairs for good/bad answers, examples of good and/or bad text generations, etc.) with which the classifier 112 can be trained. In some cases, entities within text and or may be matched using ontology 117. Ontology 117 can be a domain-specific ontology (e.g., finance, law, business, medical, science, etc.). The ontology 117, among other features, can include formal specifications of various entities and relations among them. The ontology 117 may be utilized to identify synonymous words and/or phrases. In some embodiments, ontology 117 can be pre-defined and/or application 106 can build at least a portion of ontology 117 from an external source.

MMDT Generation Module 120 can be configured to generate any suitable number of MMDTs from textual data 116 and records data store 118. These MMDTs, in some embodiments, can serve as training data to classify future input. By way of example, text within a police record (e.g., an example of textual data) may be merged with numerical based evidence (e.g., call records, financial transaction data, location data obtained from a cell phone, etc.) to generate a MMDT that relates the data associated with a particular crime instance. This MMDT may be associated with a label (e.g., extortion) and used as labeled training data for classifier 112 (e.g., an example of a machine-learning model). The classifier 112 may be trained using various instances of such training data (e.g., some examples indicating text/data records that are indicative of the crime of extortion, some examples indicating other text/data records that are not indicative of the crime of extortion, etc.) with any suitable supervised learning algorithms to configure the classifier 112 to classify subsequent input (e.g., text and data records received from the user device 104 and associated with an instant case) as either being indicative of the crime of extortion or as not being indicative of the crime of extortion. In some embodiments, the MMDT generated can be used to answer questions regarding the case for which the MMDT was generated. Operations for generating and utilizing MMDTs are discussed in more detail with respect to FIGS. 2-9.

Figure 2:
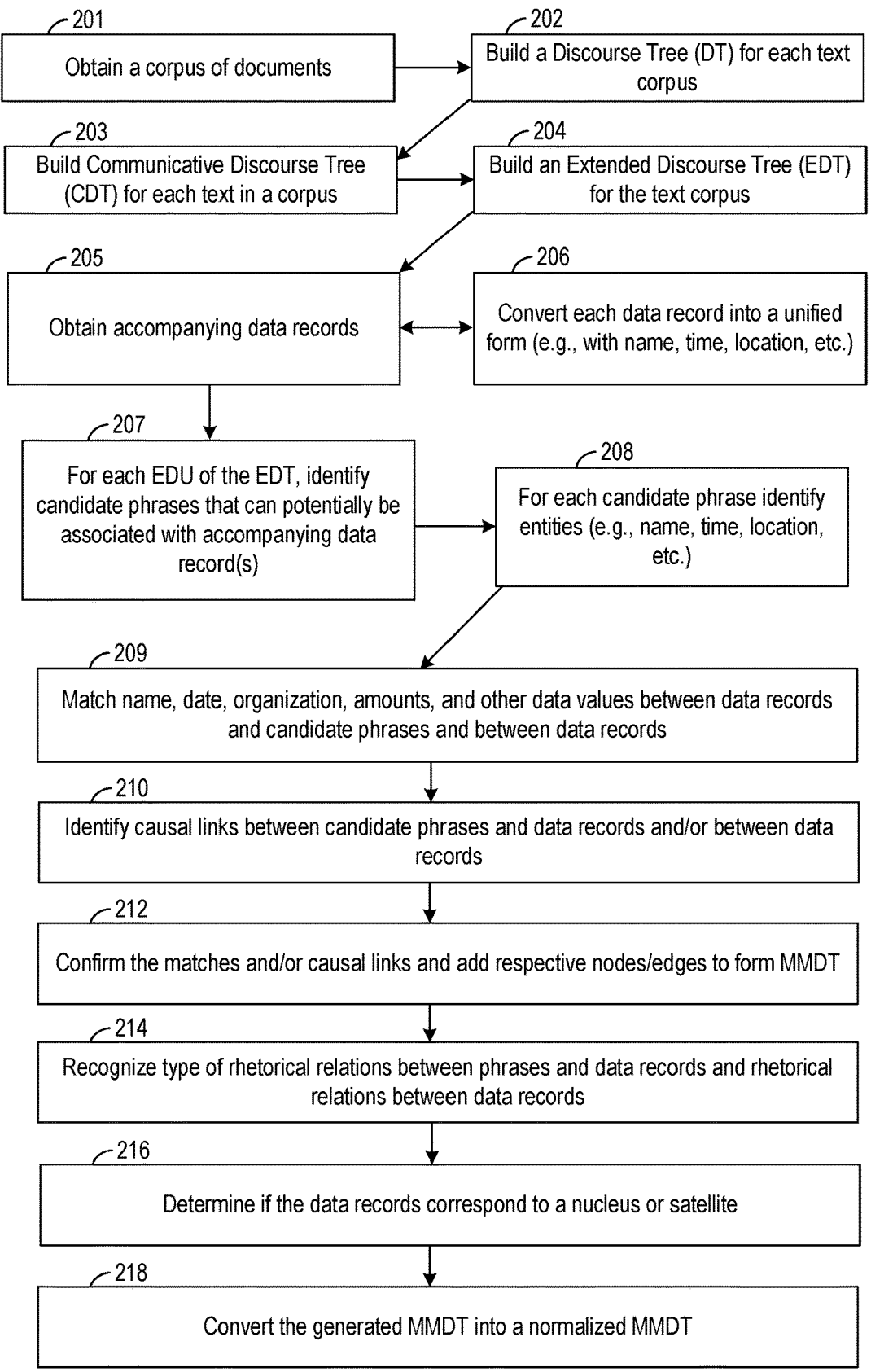
FIG. 2 depicts an example flow for a method performed by the computing device of FIG. 1 (e.g., by the Multi-Modal Discourse Tree (MMDT) Generation Module of FIG. 1), in accordance with at least one embodiment.

FIG. 2 depicts an example flow for a method 200 performed by the computing device 102 of FIG. 1 (e.g., by the MMDT Generation Module 120), in accordance with at least one embodiment.

The method 200 may begin at 201, where a corpus of documents may be obtained. In some embodiments, the corpus of documents may relate to a particular topic. By way of example, the corpus of documents could include any suitable text from a police record involving a particular crime. The documents may be of any suitable length and/or format.

At 202, a discourse tree may be generated for each text of the corpus based at least in part on Rhetorical Structure Theory. Techniques for generating these discourse trees is discussed below in connection with FIG. 3.

Figure 3:
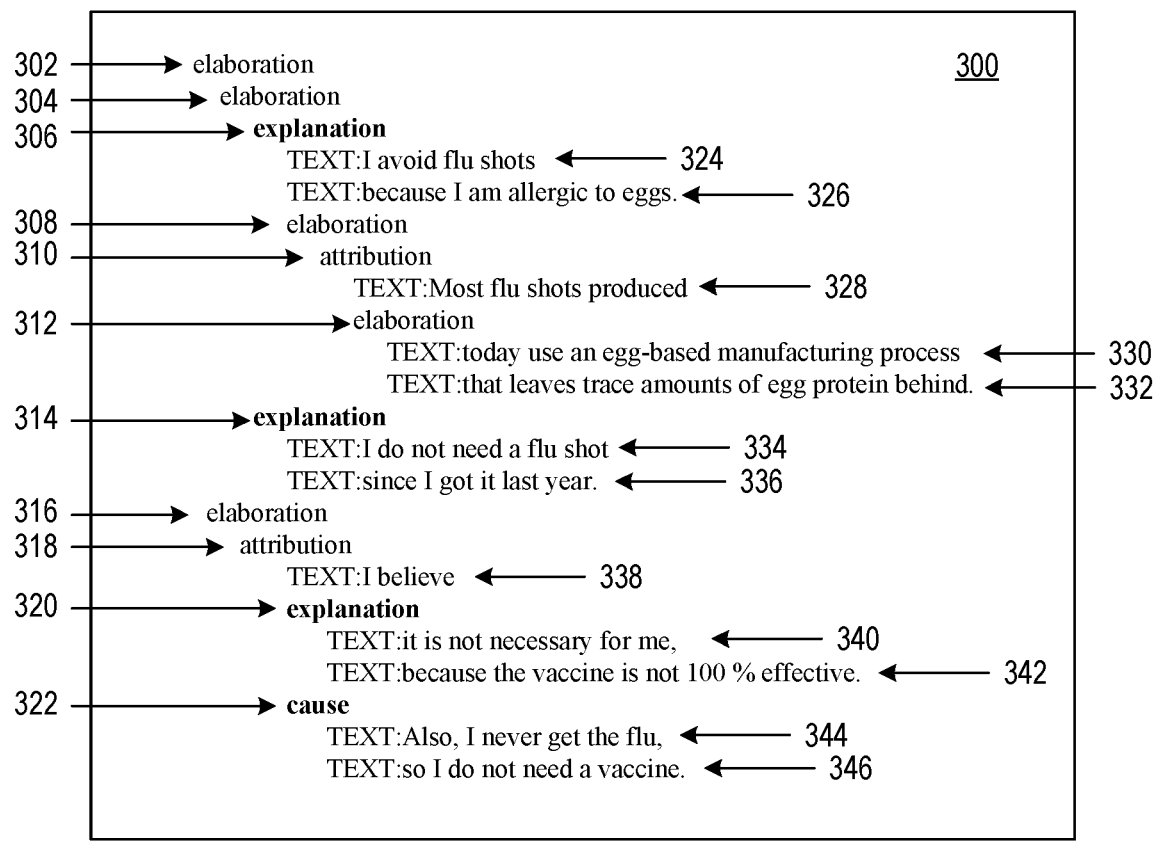
FIG. 3 depicts an example discourse tree, in accordance with at least one embodiment.

FIG. 3 depicts a text encoding 300 of a discourse tree generated (referred to as "discourse tree 300") from an instance of text, in accordance with at least one embodiment. By way of example only, the discourse tree 300 may be generated from the following text: I avoid flu shots because I am allergic to eggs. Most flu shots produced today use an egg-based manufacturing process that leaves trace amounts of egg protein behind. I do not need a flu shot since I got it last year. I believe it is not necessary for me, because the vaccine is not 100% effective. Also, I never get the flu, so I do not need a vaccine. The discourse tree 300 may be generated from the input text described above based at least in part on Rhetorical Structure Theory.

Rhetoric Structure Theory and Discourse Trees

Linguistics is the scientific study of language. For example, linguistics can include the structure of a sentence (syntax), e.g., subject-verb-object, the meaning of a sentence (semantics), e.g. dog bites man vs. man bites dog, and what speakers do in conversation, i.e., discourse analysis or the analysis of language beyond the sentence.

The theoretical underpinnings of discourse, Rhetoric Structure Theory (RST), can be attributed to Mann, William and Thompson, Sandra, "Rhetorical structure theory: A Theory of Text organization," Text-Interdisciplinary Journal for the Study of Discourse, 8(3):243-281, 1988. Similar to how the syntax and semantics of programming language theory helped enable modern software compilers, RST helped enabled the analysis of discourse. More specifically RST posits structural blocks on at least two levels, a first level such as nuclearity and rhetorical relations, and a second level of structures or schemas. Discourse parsers or other computer software can parse text into a discourse tree. These parsers/software can be configured to identify various rhetorical relationships between EDUs of the discourse tree.

Rhetoric Structure Theory models logical organization of text, a structure employed by a writer, relying on relations between parts of text. RST simulates text coherence by forming a hierarchical, connected structure of texts via discourse trees. Rhetoric relations are split into the classes of coordinate and subordinate; these relations hold across two or more text spans and therefore implement coherence. These text spans are called elementary discourse units (EDUs). Clauses in a sentence and sentences in a text are logically connected by the author. The meaning of a given sentence is related to that of the previous and the following sentences. This logical relation between clauses is called the coherence structure of the text. RST is one of a number of theories of discourse, being based on a tree-like discourse structure, discourse trees (DTs). The leaves of a DT correspond to EDUs, the contiguous atomic text spans. Adjacent EDUs are connected by coherence relations (e.g., Attribution, Sequence), forming higher-level discourse units. These units are then also subject to this relation linking. EDUs linked by a relation are then differentiated based on their relative importance: nuclei are the core parts of the relation, while satellites are peripheral ones. As discussed, in order to determine accurate request-response pairs, both topic and rhetorical agreement are analyzed. When a speaker answers a question, such as a phrase or a sentence, the speaker's answer should address the topic of this question. In the case of an implicit formulation of a question, via a seed text of a message, an appropriate answer is expected not only maintain a topic, but also match the generalized epistemic state of this seed.

Rhetoric Relations

As discussed, aspects described herein use discourse trees (and/or communicative discourse trees) that include rhetorical relations. Rhetorical relations can be described in different ways. Some rhetorical relations are provided below. However, this list is not intended to be exhaustive.

| Relation Name | Nucleus | Satellite |
|---|---|---|
| Antithesis | ideas favored by the author | ideas disfavored by the author |
| Attribution | a statement | information describing additional information attributed to the statement |
| Background | text whose understanding is being facilitated | text for facilitating understanding |
| Cause | a statement | information describing a causal link between the statement and an assertion |
| Circumstance | text expressing the events or ideas occurring in the interpretive context | an interpretive context of situation or time |
| Concession | situation affirmed by author | situation which is apparently inconsistent but also affirmed by author |
| Condition | action or situation whose occurrence results from the occurrence of the conditioning situation | conditioning situation |
| Elaboration | basic information | additional information |
| Enablement | an action | information intended to aid the reader in performing an action |
| Evaluation | a situation | an evaluative comment about the situation |
| Evidence | a claim | information intended to increase the reader's belief in the claim |
| Explanation | a statement | information describing one or more reasons for the statement |
| Interpretation | a situation | an interpretation of the situation |
| Justify | text | information supporting the writer's right to express the text |
| Motivation | an action | information intended to increase the reader's desire to perform the action |
| Non-volitional Cause | a situation | another situation which causes that one, but not by anyone's deliberate action |
| Non-volitional Result | a situation | another situation which is caused by that one, but not by anyone's deliberate action |
| Otherwise (anti conditional) | action or situation whose occurrence results from the lack of occurrence of the conditioning situation | conditioning situation |
| Purpose | an intended situation | the intent behind the situation |
| Restatement | a situation | a re-expression of the situation |
| Solutionhood | a situation or method supporting full or partial satisfaction of the need | a question, request, problem, or other expressed need |
| Summary | text | a short summary of that text |
| Volitional Cause | a situation | another situation which causes that one, by someone's deliberate action |
| Volitional Result | a situation | another situation which is caused by that one, by someone's deliberate action |

Some empirical studies postulate that the majority of text is structured using nucleus-satellite relations, but other relations do not carry a definite selection of a nucleus. Examples of such relations are shown below.

| Relation Name | Span | Other Span |
|---|---|---|
| Contrast | One alternate (unconstrained) | The other alternate (unconstrained) |
| Joint | | |
| List | An item | A next item |
| Sequence | An item | A next item |

Returning to FIG. 3, the discourse tree 300 may be generated based on parsing (e.g., using a discourse parser and/or software) the input text. Discourse tree 300 may include any suitable combination of the rhetorical relations (also referred to as "rhetorical relationships") described above. For example, discourse tree 300 may include rhetorical relationships 302-322. Discourse tree 300 may further include a number of textual units (e.g., elementary discourse unit (EDU) 324-346). Each rhetorical relation describes a rhetorical relationship between two or more EDUs. By way of example, rhetorical relation 314 may describe a rhetorical relationship (e.g., "explanation") between EDU 334 and EDU 336.

Any suitable method for constructing the discourse tree 300 may be utilized. One example method for constructing discourse tree 300 may include the following operations:
(1) Divide the discourse text into units by:
  (a) Unit size may vary, depending on the goals of the analysis
  (b) Typically, units are clauses
(2) Examine each unit, and its neighbors. Is there a relation holding between them (e.g., identified based at least in part on a set of predefined rules)?
(3) If yes, then mark that relation.
(4) If not, the unit might be at the boundary of a higher-level relation. Look at relations holding between larger units (spans).
(5) Continue until all the units in the text are accounted for.

In some embodiments, the MMDT Generation Module 120 may generate a discourse tree for each text of the corpus. There may be a discourse tree generated for various degrees of granularity. For example, a DT may be generated for each sentence, for each paragraph, for each document, etc. Each discourse tree may include nodes, each nonterminal node (or edge) representing a rhetorical relationship between two of fragments (e.g., sentence fragments) and each terminal node of the nodes of the discourse tree being associated with one of the fragments.

Figure 4:
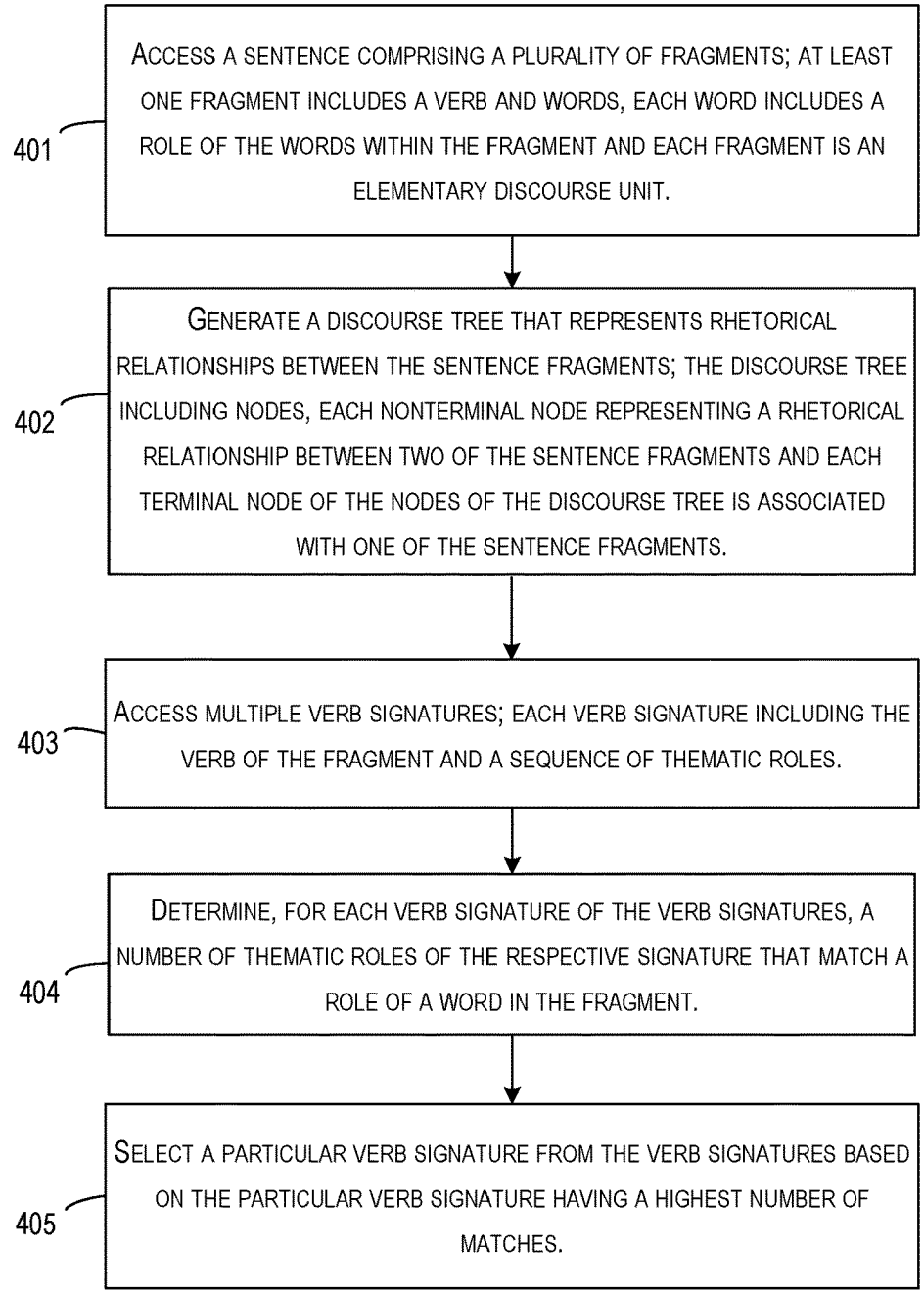
FIG. 4 depicts a flow for a method for generating a communicative discourse tree, in accordance with at least one embodiment.

Returning to FIG. 2, once the DTs are generated (according to any suitable granularity) for the text(s) of the corpus (e.g., a police report and/or textual information related to a crime instance), the method 200 may proceed to 203, where a communicative discourse tree (CDT) for each text of the corpus may be generated. FIG. 4 described in more detail techniques for generating a CDT from text.

FIG. 4 depicts a flow for a method 400 for generating a communicative discourse tree, in accordance with at least one embodiment. In some embodiments, utilizing communicative discourse trees to generate the queries enables improved search engine results.

At block 401, process 400 involves accessing a sentence including fragments (e.g., sentence of the corpus obtained at 201 of FIG. 2). At least one fragment includes a verb and one or more words and each word includes a role of the words within the fragment, and each fragment is an elementary discourse unit.

In some embodiments, the MMDT Generation Module 120 of FIG. 1 may identify that the sentence includes several fragments. Each fragment may include a verb, although, a fragment need not include a verb.

At block 402, process 400 involves generating a discourse tree that represents rhetorical relationships between the sentence fragments. For example, the MMDT Generation Module 120 may generate one or more discourse trees as discussed in connection with FIG. 3. Each discourse tree may include nodes, each nonterminal node representing a rhetorical relationship between two of the sentence fragments and each terminal node of the nodes of the discourse tree is associated with one of the sentence fragments.

At block 403, process 400 involves accessing multiple verb signatures. For example, the MMDT Generation Module 120 may access a list of verbs, (e.g., from VerbNet, a predefined list of verbs, etc.). Each verb may match or may relate to the verb of the fragment. For example, if a fragment included the verb "deny," the MMDT Generation Module 120 may access a list of verb signatures that relate to the verb deny.

Each verb signature may include the verb of the fragment and one or more of thematic roles. For example, a signature includes one or more of noun phrase (NP), noun (N), communicative action (V), verb phrase (VP), or adverb (ADV). The thematic roles describing the relationship between the verb and related words. For example, "the teacher amused the children" has a different signature from "small children amuse quickly." For the first fragment, the verb "deny," application 102 accesses a list of frames, or verb signatures for verbs that match "deny." The list is "NP V NP to be NP," "NP V that S" and "NP V NP."

Each verb signature includes thematic roles. A thematic role refers to the role of the verb in the sentence fragment. In some embodiments, MMDT Generation Module 120 determines the thematic roles in each verb signature. Example thematic roles include actor, agent, asset, attribute, beneficiary, cause, location destination source, destination, source, location, experiencer, extent, instrument, material and product, material, product, patient, predicate, recipient, stimulus, theme, time, or topic.

At block 404, process 400 involves determining, for each verb signature of the verb signatures, a number of thematic roles of the respective signature that match a role of a word in the fragment. For example, if a fragment of the raw text sentence includes the verb "deny," the MMDT Generation Module 120 may determine that the verb "deny" has only three roles, "agent", "verb" and "theme."

At block 405, process 400 involves selecting a particular verb signature from the verb signatures based on the particular verb signature having a highest number of matches. For example, a fragment "the rebels deny . . . that they control the territory" can be matched to verb signature deny "NP V NP", and "control" is matched to control (rebel, territory). Verb signatures are nested, resulting in a nested signature of "deny (rebel, control (rebel, territory))." Each selected verb signature is associated with a corresponding fragment to complete the communicative discourse tree.

Figure 5:
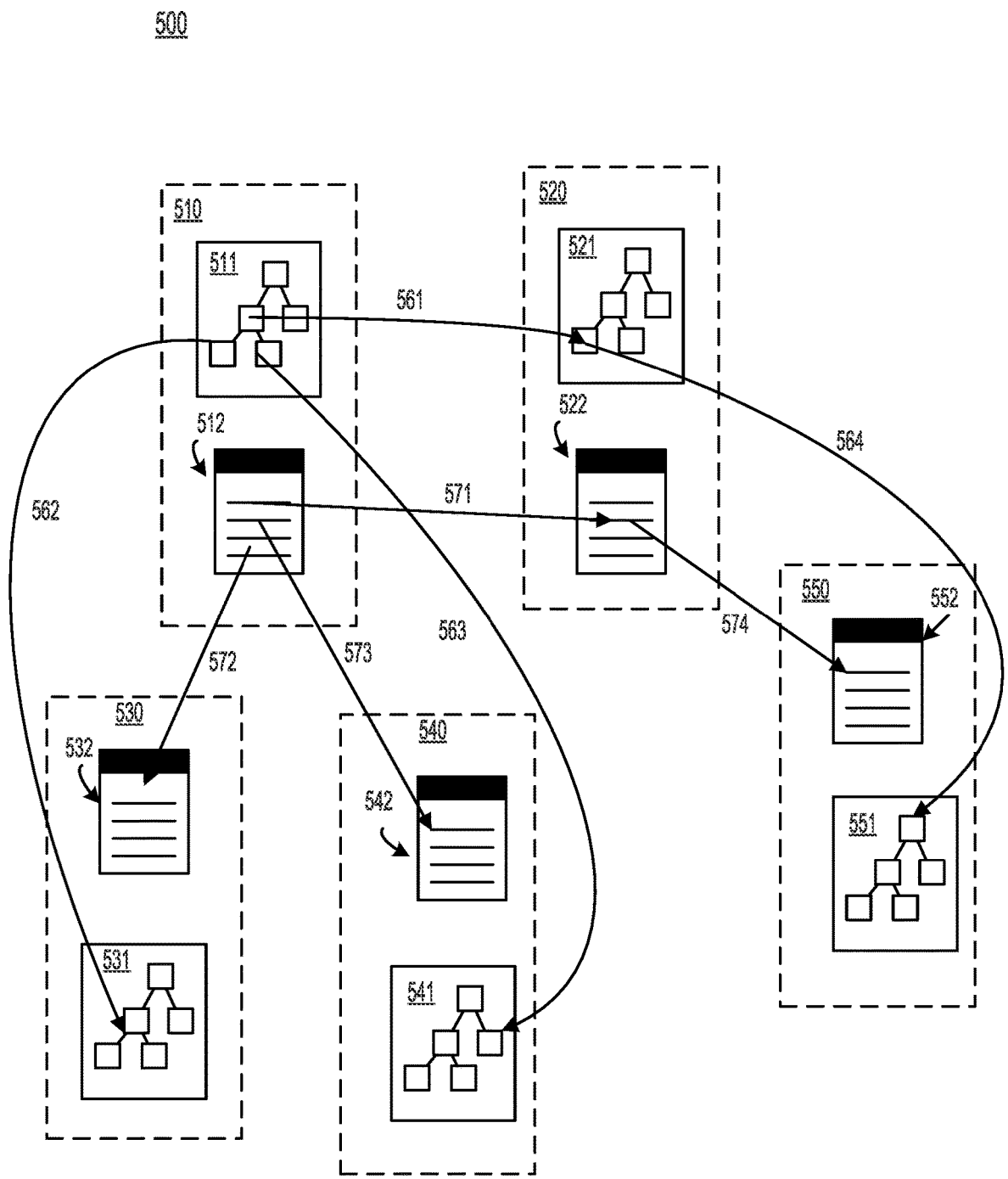
FIG. 5 depicts an example of an extended discourse tree, in accordance with at least one embodiment.
Figure 6:
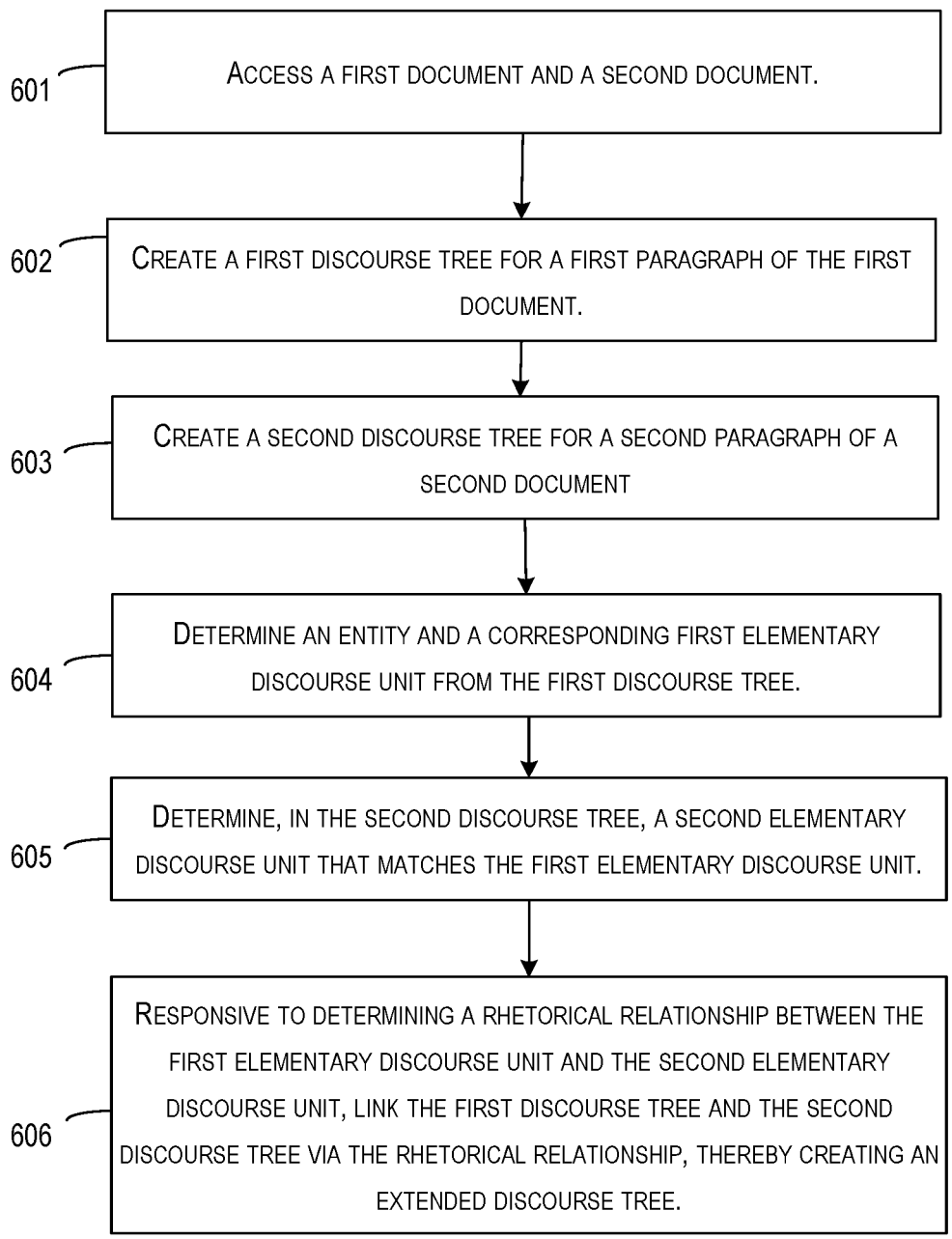
FIG. 6 depicts a flowchart of an example of a process for creating an extended discourse tree, in accordance with at least one embodiment.

Returning to FIG. 2 at 204, once a communicative discourse tree (CDT) is generated for the corpus of text in the manner described above in connection with FIGS. 3 and 4, the MMDT Generation Module 120 can build an extended discourse tree (EDT) for the text corpus. FIGS. 5 and 6 described in more detail techniques for generating a EDT for the text corpus.

FIG. 5 depicts an example of an extended discourse tree, in accordance with at least one embodiment. FIG. 5 depicts extended discourse tree 500. Extended discourse tree 500, as depicted, includes groups 500, 520, 530, 540, and 550. Each group includes a document (e.g., from the text corpus) and a discourse tree generated from the document. For example, group 510 includes discourse tree 511 and document 512, group 520 includes discourse tree 521 and document 522, and so on. The discourse trees depicted in FIG. 5 may be an example of the DTs generated as described above at 202 of FIG. 2 and/or the discourse trees of FIG. 5 may be an example of the CDTs generated as described above at 203 of FIG. 2.

In addition to links between within particular discourse trees, e.g., discourse trees 511, 521, 531, 541, and 551, extended discourse tree 500 includes inter-discourse tree links 561-564 and associated inter-document links 571-574. As explained further with respect to FIG. 6, MMDT Generation Module 120 may construct discourse trees 511-515. Discourse tree 511 represents document 512, discourse tree 521 represents document 522, and so on. Extended discourse tree 500 may be built by building a discourse tree (e.g., a DT and/or a CDT) for each paragraph or document (e.g., using the process 400 for each tree).

Inter-discourse tree link 561 connects discourse tree 511 and 521, inter-discourse tree link 562 connects discourse tree 521 and 531, inter-discourse tree link 563 connects discourse tree 511 and 541, and inter-discourse tree link 564 connects discourse tree 521 and 551. Based on inter-discourse tree links 561-564, MMDT Generation Module 120 creates inter-document links 571, 572, 573, and 574, which correspond to inter-discourse tree links 561, 562, 563, and 564 respectively. Inter-document links 571-574 can be used to navigate documents 512, 522, 532, 542, and 552.

MMDT Generation Module 120 determines one or more entities within a first discourse tree of the discourse trees 511-515. Examples of entities include places, things, people, or companies. MMDT Generation Module 120 then identifies the same entities present in the other discourse trees. Based on the determined entities, MMDT Generation Module 120 determines a rhetorical relationship between each matching entity. These determinations may utilize the same discourse rules that are used to generate discourse tree.

For example, if an entity "San Francisco" occurs in document 512, e.g., "San Francisco is in California," and document 522 further explains that "San Francisco has a moderate climate but can be quite windy," MMDT Generation Module 120 could determine that the rhetorical relationship between the entity "San Francisco" is one of "elaboration" and mark links 561 and 571 as "elaboration." In some embodiments, the MMDT Generation Module 120 may utilize a discourse parser to parse the combination of EDUs (e.g., "San Francisco is in California" from document 512 and "San Francisco has a moderate climate but can be quite windy," from document 522) to identify one is an elaboration of the other. In some embodiments, the relationship may be unidirectional or multiple rhetorical relationships may be used to represent a bidirectional relationship (e.g., to indicate that each of the two EDUs is an elaboration of the other). Continuing with the example, MMDT Generation Module 120 determines links 562-564 and corresponding links 572-574 based on determined rhetorical relations. MMDT Generation Module 120 combines the discourse trees of the paragraphs of the documents to form extended discourse tree 500.

By using the links in extended discourse tree 500, MMDT Generation Module 120 can navigate between paragraphs of the same document or between documents, e.g., document 512 and 522. For example, if a user is interested in more information on a particular topic, MMDT Generation Module 120 can navigate through an elaboration rhetorical relation from nucleus to satellite within a paragraph or an elaboration rhetorical relation hyperlink to a document that offers more specific information on the topic.

Conversely, if a user decides that a suggested topic is not exactly what is needed, the user can return to a higher-level view of the documents (e.g., from satellite to nucleus, or from narrow document to broad document). In turn, MMDT Generation Module 120 can navigate an elaboration relationship in the opposite order, i.e., from a satellite to the nucleus at either the paragraph or between documents. Similarly, MMDT Generation Module 120 can facilitate other navigation options such as relying on contrast or condition rhetorical relationships for exploring controversial topics.

To build rhetoric links between text fragments in different paragraphs or documents, MMDT Generation Module 120 may identify a relationship between entities by using a fictitious text fragment, or a temporary paragraph, from the respective text fragments of the original paragraph and perform coreference analysis and discourse parsing on the paragraph. In some embodiments, MMDT Generation Module 120 may utilize an ontology (e.g., the ontology 117 of FIG. 1) to identify relationships between entities based on the relationships provided in that ontology.

FIG. 6 depicts a flowchart of an example of a process 600 for creating an extended discourse tree (e.g., the extended discourse tree 500 of FIG. 5), in accordance with at least one embodiment. The input of process 600 is a set of documents, and an output is an extended discourse tree, which is encoded as a regular discourse tree with the labels of document identification for each node. For example purposes, process 600 is described with respect to two documents, e.g., documents 110a-b (e.g., examples of the corpus texts obtained at 201 of FIG. 2), but process 600 can use any number of documents.

At block 601, process 600 involves accessing a first document and a second document. Examples of documents include texts, books, news articles, and other electronic textual documents. In the example provided within the domain of law enforcement, the documents can be any suitable textual document corresponding to an instance of an alleged crime. The documents can include police reports, statements by witnesses/victim/alleged perpetrator, and the like.

In an aspect, MMDT Generation Module 120 performs document analysis that includes the generation of document trees representing the sentential and phrasal structure of the document. Rhetorical relations associated with an inter-document link can determine different navigation scenarios. By default, elaboration can be used. MMDT Generation Module 120 can offer a link to another document that is related by an attribution relation if the user is interested in questions such as "why," or "how." MMDT Generation Module 120 can offer a link to a document that is related by a contrast relation if a user expresses disagreement with an originally presented document or asks for a document that provides a counterpoint to the current document.

In a further aspect, MMDT Generation Module 120 obtains the first and second document. At block 602, process 600 involves creating a first discourse tree for a first paragraph of a first document. MMDT Generation Module 120 accesses a paragraph from the first document. Each sentence of the paragraph includes fragments, or elementary discourse units. At least one fragment includes a verb. Each word in the fragment includes role, e.g., the function, of the word within the fragment. MMDT Generation Module 120 generates a discourse tree that represents rhetorical relationships between the fragments in accordance with the techniques described above in connection with FIG. 3. The discourse tree includes multiple nodes, each nonterminal node representing a rhetorical relationship between two fragments and each terminal node associated with one of the fragments. MMDT Generation Module 120 continues in this manner, building a set of discourse trees for each paragraph in the first document. Process 600 is described with respect to a paragraph as a unit of text but other sizes of text can be used (e.g., sentence, page, chapter, etc.).

At block 603, process 600 involves creating second discourse tree for a second paragraph of a second document. At block 603, process 600 performs substantially similar steps for the second document as performed for the first document at block 602. In the case that process 600 creates an extended discourse tree for more than two documents, process 600 performs the functions described at block 602 on multiple documents. Process 600 can iterate through all pairs of discourse trees in the set of discourse trees where each discourse tree corresponds to a document. Pairs of discourse trees can be represented by:

$$DT_i \text{ and } DT_j \in DTA.$$

At block 604, process 600 involves determining an entity and a corresponding first elementary discourse unit from the first discourse tree. Various methods can be used such as keyword processing (searching for one of a list of predefined keywords in the sentences of the first document), using a trained machine-learning model, or searching an internet resource. MMDT Generation Module 120 identifies all noun phrases and named entities in the discourse trees $DT_i$ and $DT_j$.

In an example, MMDT Generation Module 120 extracts a noun phrase from the discourse tree. MMDT Generation Module 120 then classifies the noun phrase as either (i) an entity or (ii) not an entity by using a trained machine learning model.

At block 605, process 600 involves determining, in the second discourse tree, a second elementary discourse unit that matches the first elementary discourse unit. More specifically, MMDT Generation Module 120 computes overlap and identify common entities $E_{i,j}$ between $DT_i$ and $DT_j$. MMDT Generation Module 120 establishes relationships between occurrences of entities in $E_{i,j}$ such as equals, sub-entity, or part-of. MMDT Generation Module 120 then forms inter-paragraph rhetorical links $R(E_{i,j})$ for each entity pair occurrence in $E_{i,j}$.

At block 606, process 600 involves responsive to determining a rhetorical relationship between the first elementary discourse unit and the second elementary discourse unit, linking the first discourse tree and the second discourse tree via the rhetorical relationship, thereby creating an extended discourse tree. More specifically, MMDT Generation Module 120 classifies a rhetorical relation for each rhetorical link by forming a merging of text fragments, e.g., $EDU(E_i)$ and $EDU(E_j)$, building its DT and using recognized relation label for this rhetorical link.

In an aspect, MMDT Generation Module 120 combines the first elementary discourse unit and the second elementary discourse unit into a temporary paragraph. Discourse navigation application 102 then determines a rhetorical relationship between the first and second elementary discourse units within the temporary paragraph by applying discourse parsing to the temporary paragraph.

In a further aspect, responsive to not determining a rhetorical relationship, MMDT Generation Module 120 creates a default rhetorical relationship of type elaboration between the first elementary discourse unit and the second elementary discourse unit and links the first discourse tree and the second discourse tree.

In an aspect, MMDT Generation Module 120 performs automated building and categorizing of links between textual spans across documents. Here the following family of approaches can be used: lexical distance, lexical chains, information extraction, and linguistic template matching. Lexical distance can use a cosine similarity across pairs of sentences, and lexical chains can be more robust leveraging synonymy and hypernymy.

Extended discourse trees can form relationships between two or more documents at different levels of granularity. For example, relationships can be determined between elementary discourse units, as described with respect to process 600. Additionally, extended discourse trees can represent relationships between words, sentences, paragraphs, sections of documents, or entire documents. As depicted, each individual graph consists of smaller subgraphs for each individual document. Links are shown that represent logical connection between topics within a single document.

Figure 7:
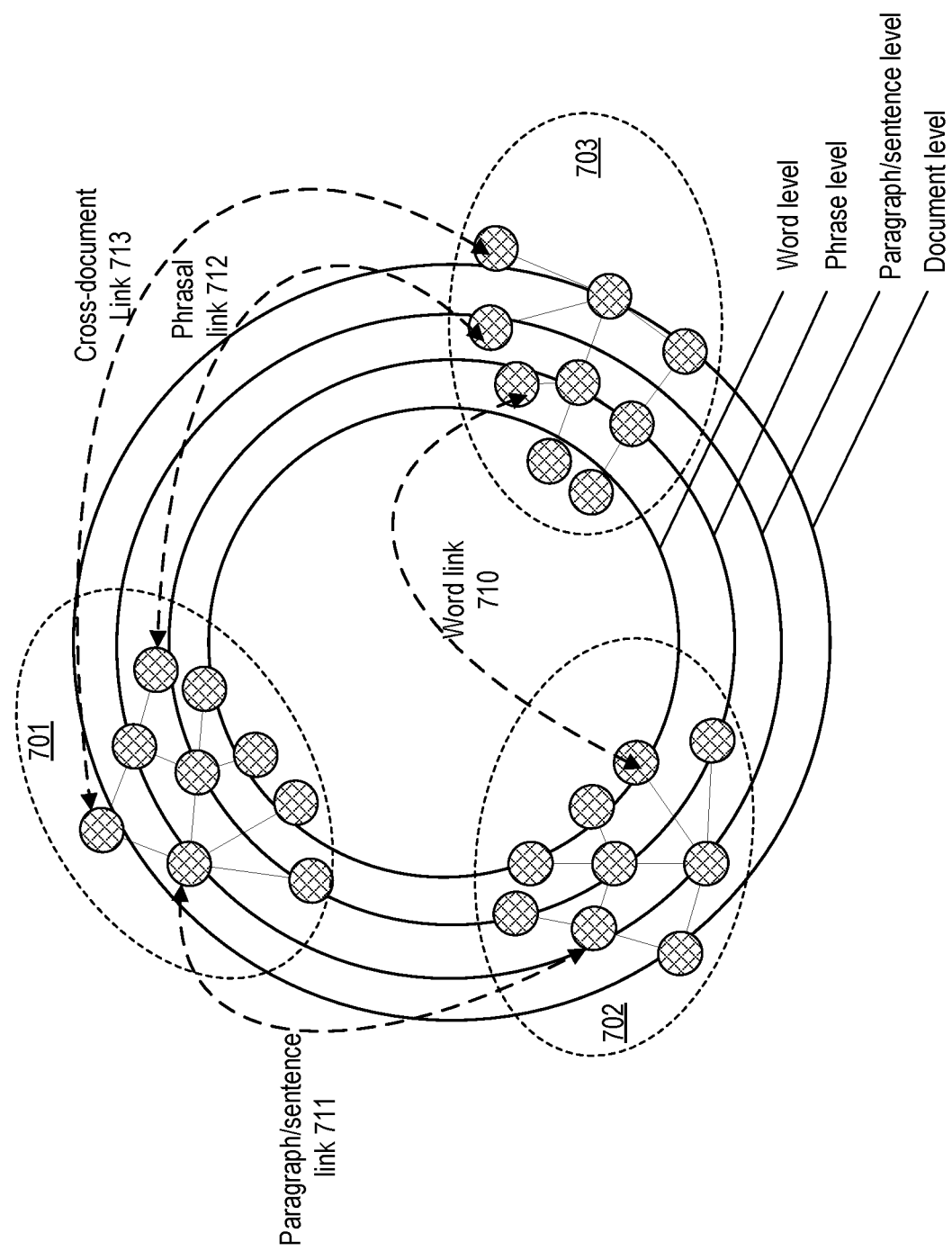
FIG. 7 also depicts relationships between textual units of documents at different levels of granularity, in accordance with at least one embodiment.

FIG. 7 also depicts relationships between textual units of documents at different levels of granularity, in accordance with an aspect. FIG. 7 depicts discourse trees 701, 702, and 703, each corresponding to a separate document. FIG. 7 also depicts various inter-document links, such as word link 710 that links words in documents 702 and 703, paragraph/sentence link 711 that links paragraphs or sentences in documents 701 and 702, phrasal link 712 that links phrases in documents 701 and 703, and cross-document link 713 that links documents 701 and 703. MMDT Generation Module 120 can use links 710-713 to navigate between documents 701-703.

Extended discourse trees such as those created by process 700 can be used to navigate documents or other bodies of text. Extended discourse trees enable different applications such as autonomous agents, improved search and navigation, and question-answer coordination. In some embodiments, EDTs such as those created by process 700 may be utilized, at least in part, as training data to train a classifier (e.g., classifier 112 of FIG. 1) to classify input (e.g., any suitable input including text and/or numerical based data).

Returning to FIG. 2, at 205, accompanying data records may be obtained. In the ongoing example in which a police record is utilized, accompanying data records may include any suitable data record. By way of example only, the data record(s) of the example may include call logs, location data, financial transactions (e.g., bank statements), web page visits, images, and the like. Data records, in general, may be obtained from the same or different sources. These sources may differ from the source of the textual data.

At 206, each data records may have at least some portion of the record converted into a unified form. For example, each data source may be converted into a unified, canonical form with normalized named entities such as: time, date, location, person name, phone number, account number (if available). In some embodiments, the specific form and/or content converted may depend on the context and a set of predefined rules. In some embodiments, although this information may be initially provided in a different form or by a different identifier, the set of rules and/or the ontology 117 may be utilized to identify a unified identifier (e.g., name) and the data of each record may be associated with the identifier (e.g., the originally included identifier and/or the unified identifier).

At 207, for each elementary discourse unit (EDU) of the EDT (e.g., generated from the corpus of text), a number of candidate phrases may be identified that can potentially be associated with accompanying data records. In some embodiments, identifying particular candidate phrases (e.g., particular EDUs) can depend on the domain and a predefined protocol for identifying such candidate phrases.

At 208, for each candidate phrase, the MMDT Generation Module 120 may identify entities of the candidate phrase. In some embodiments, the specific entities identified may depend on the context/domain and a set of predefined rules. In some embodiments, although this information may be initially provided in a different form or by a different identifier, the set of rules and/or the ontology 117 may be utilized to identify a unified identifier (e.g., name) and candidate phrase may be associated with the identifier (e.g., the originally included identifier and/or the unified identifier).

At 209, the MMDT Generation Module 120 may identify entities that match between data records and candidate phrases and/or between data records. For example, the MMDT Generation Module 120 may iterate through each entity of each data record and compare those entities with the entities associated with the other data records. An association between two data records having a matching entity may be maintained for any suitable number of matches found. In some embodiments, a list of matching data records may be maintained. As another example, the MMDT Generation Module 120 may iterate through each candidate phrase and compare the entity/entities of the candidate phrase to the entities associated with each data record. If a match is found between the candidate phrase and the data record, an association indicating the match may be maintained. In some embodiments, a list of matching EDU/data records pairs may be maintained.

At 210, the MMDT Generation Module 120 may perform operations to determine a causal link between data records and/or between EDUs (candidate phrases) and data records. Usually, multiple data records are inter-connected and represent correlated events, some of them cause other ones. An algorithm for identifying causal links (e.g., when events referenced in one data record cause events referenced in another data record and/or between EDUs and data records). For example, if person A calls person B and then person A transfers money to person B, a set of rules can be employed to identify that the former event causes the latter. In some embodiments, these rules can be based on the premise that there is no coincidence between the values in data records: if they share the value, the earlier event causes the later event. Thus, a data record can be identified as a cause of another data record or an event described in text, and vice versa.

An algorithm for identifying causal links (e.g., a causal link identification algorithm) is provided. In some embodiments, two operators R(.) (reason) and C(.) (conclusion) and an additional negation—may be utilized. Two negation operators are needed: ¬ for denying propositional formulas (¬x denotes that x is false), and—for denying R(.) and C(.). An argument is a formula of the form R(y):(−)C(x). An argument is a reason for concluding a claim. It has two main parts: premises (the reason) and a conclusion. The functions R and C respectively play the roles of giving reason and concluding. An argument may be interpreted as follows: its conclusion holds because it follows, according to a given notion, from the premises. The notion refers to the nature of the link between them (e.g., the premises imply the conclusion), formally identified by the colon in the definition. However, the conclusion may be true while the functions do not hold and vice versa.

For example, R(y):C(x) corresponds to an output that indicates "y is a reason for concluding x" and R(y):−C(x) corresponds to an output that indicates "y is a reason for not concluding x." Handling of a nested argument is important for finding a defeating answer since it is insufficient to handle only the object-level or only the meta-level layer of argumentation separately. Nested arguments are central to tackling texts and dialogues: a support for nested arguments and rejections has to be provided. Table 2 shows various forms of arguments and rejections allowed by a set of predefined definitions (x, y, z, t are propositional formulas to simplify matters). The table is not exhaustive.

TABLE 2

| | Discourse representation or arguments and their rejections | |
|---|---|---|
| Basic arguments | My credit card is operational o(c). It is not blocked ¬b(c) | R (¬b(c)):C(o(c)) |
| | My credit card has been compromised m(c). It is blocked | R (b(c)):C(m(c)) |
| | Credit card is operational. Thus, it is not possible to conclude that a charge can be declined (d(c) | R(o(c)):–C(d(c)) |
| Single-embedding meta-arguments in reason R | That debit card can be used u(c) because it is operational, is a reason to conclude that the balance is positive (p(b)) | R(R(u(c)):C(o(c))):C(p(b)) |
| | That card is not declined because it has a positive balance is a reason to conclude that it has not been compromised (m(c)). | R(R(¬d(c)):C(p(b))):C(¬m(c)) |
| | Card is operational because its balance is positive, so we cannot conclude that it was blocked | R(R(p(b)):C(o(c))):–C(b(c)) |
| Single-embedding meta-arguments in conclusion C | The balance on the card is negative. Thus the charge/use attempt will lead to non-sufficient fund fee (nsf(c)) | R(¬b(c)):C(u(c):C(nsf(c))) |
| | The fact that a card has been declined in the past is a reason to conclude that having a positive balance is not a sufficient reason for a credit card to always be operational | R(d(c)):C(–R(p(b)):C(o(c))) |
| | The fact that all credit cards of team members are operational is a reason for not concluding that a decline charge of a particular high cost transaction h(c) is a reason for team credit cards to be compromised. | R(o(c)):–C(R(h(c)):C(m(c))) |
| Double embedding of meta-arguments | Bad credit history (ch(b)) leads to a decline of a credit card application (d(a(c))). Once a user is unable to use credit card (u(c)) it is hard to get a loan (l(u)) | R(R(ch(b)):C(d(a(c)))):C(R(u(c)):C(l(u))) |
| | Good credit history (ch(g)) usually tells us that a credit card application is not declined (d(a(c))). However, we cannot imply that successful credit card application leads to a loan approval (other factors play the role as well) | R(R(ch(g)):C(d(a(c)))):–C(R(d(a(c))):C(l(u))) |

The example arguments of Table 2 concern the functionality of a credit card. By default, a credit card works (is operational), especially if there is a positive account balance. However, there are exceptions: for whatever reason a bank may decline a transaction. These examples illustrate that the inner and outer reason R as well as claim C can be potentially identified using argument mining techniques. Furthermore, by recursion, the inner reasons and claims can be identified by argument mining techniques. Thus, the nested structure appears to be better suited as a target language for arguments as they arise in natural language dialogues and texts.

Table 3 includes templates that can be used by the MMDT Generation Module 120 to extract logical atoms from EDUs (e.g., candidate phrases), translate rhetorical relations into R-C operators and form a logical representation of arguments. To do that, a semantic representation for the expressions of interest related to banking ch(g) can be built. These semantic representations can be associated with an EDU. The determined structure of the discourse tree may be used to then forms R-C representations in L, which are subject to argumentation analysis in downstream components.

TABLE 3

| | Discourse trees and/or Reason-Conclusion Representation for selected examples | |
|---|---|---|
| Example | Discourse Tree | R-C Representation |
| My credit card is operational o(c). It is not blocked ¬b(c) | | R (¬b(c)):C(o(c)) |
| My credit card has been compromised m(c). It is blocked | | R (b(c)):C(m(c)) |
| Credit card is operational. Thus, it is not possible to | | R(o(c)):–C(d(c)) |

TABLE 3-continued

Discourse trees and/or Reason-Conclusion Representation for selected examples

| Example | Discourse Tree | R-C Representation |
|---|---|---|
| conclude that a charge can be declined (d(c)) | | |
| That debit card can be used u(c) because it is operational, is a reason to conclude that the balance is positive (p(b)) | cause<br>  explanation (LeftToRight)<br>    TEXT: That debit card can be used,<br>    TEXT: because it is operational,<br>  cause (LeftToRight)<br>    TEXT: is a reason<br>    attribution (RightToLeft)<br>      TEXT: to conclude<br>      TEXT: that the balance is positive | R(R(u(c)):C(o(c))):C(p(b)) |
| That card is not declined because it has a positive balance. It is a reason to conclude that it has not been compromised (m(c)). | | R(R(¬d(c)):C(p(b))):C(¬m(c)) |
| Card is operational because its balance is positive, so we cannot conclude that it was blocked | conclusion (LeftToRight)<br>  cause (LeftToRight)<br>    TEXT: Card is operational<br>    TEXT: because its balance is positive,<br>  attribution (RightToLeft)<br>    TEXT: so we can not conclude<br>    TEXT: that it was blocked | R(R(p(b)):C(o(c))):−C(b(c)) |
| The balance on the card is negative. Thus the charge or use attempt will lead to non-sufficient fund fee | elaboration (LeftToRight)<br>  cause (LeftToRight)<br>    TEXT: The balance on the card is negative<br>    cause(LeftToRight)<br>      TEXT: Thus the charge/use attempt will lead to<br>      TEXT non-sufficient fund fee | R(¬b(c)):C(u(c):C(nsf(c))) |
| The fact that a card has been declined in the past is a reason to conclude that having a positive balance is not a sufficient reason for a credit card to always be operational | reason(LeftToRight)<br>  elaboration (LeftToRight)<br>    TEXT: The fact<br>    TEXT: that a card has been declined in the past is a reason<br>  conclusion(RightToLeft)<br>    TEXT: to conclude<br>    cause(LeftToRight)<br>      TEXT: that having a positive balance is not a sufficient reason<br>      TEXT: for a credit card to always be operational | R(d(c)):C(−R(p(b)):C(o(c))) |
| The fact that all credit cards of team members are operational is a reason for not concluding that a decline charge of a particular high cost transaction h(c) is a reason for team credit cards to be compromised | elaboration (LeftToRight)<br>  TEXT: The fact<br>  reason(LeftToRight)<br>    TEXT: that all credit cards of team members are operational is a reason<br>  conclusion(RightToLeft)<br>    TEXT: for not concluding<br>    cause(LeftToRight)<br>      TEXT: that a decline charge of a particular high cost transaction is a reason for team credit cards<br>      TEXT: to be compromised | R(o(c)):−C(R(h(c)):C(m(c))) |
| Bad credit history (ch(b)) leads to a decline of a credit card application (d(a(c))). Thus once a user is unable to use credit card (u(c)) it is hard to get a loan (l(u)) | cause(LeftToRight)<br>  cause(LeftToRight)<br>    TEXT: Bad credit history<br>    TEXT: leads to a decline of a credit card application.<br>  cause (LeftToRight)<br>    TEXT: Thus once a user is unable to use credit card<br>    TEXT: it is hard to get a loan, | R(R(ch(b)):C(d(a(c)))):C(R(u(c)):C(l(u))) |
| Good credit history (ch(g)) usually tells us that a credit card application is not declined (d(a(c))). However, we cannot imply that | explanation (RightToLeft)<br>  cause (RightToLeft)<br>    TEXT: Good credit history usually tells us<br>    TEXT: that a credit card application is not declined.<br>  cause | R(R(ch(g)):C(d(a(c)))):−C(R(d(a(c))):C(l(u))) |

TABLE 3-continued

Discourse trees and/or Reason-Conclusion Representation for selected examples

| Example | Discourse Tree | R-C Representation |
|---|---|---|
| successful credit card application leads to a loan approval (other factors play the role as well) | TEXT: However, we can not imply that successful credit card application TEXT: leads to a loan approval. | |

The MMDT Generation module 120 can generate two causal chains (e.g., one from an EDU/fragment of a discourse tree generated from the corpus of text and the other from an EDU generated from text of a data record, from respective EDUs of two discourse trees, from respective EDUs generated from the text of two different data records, etc.) according to the rules provided above and/or below and determine if the result of the first chain is caused or implied by the latter or the formal. A set of arguments and their rejections may be provided as a set of formulas, some of which are identified below. A consequence operator—is the least closure of a set of inference rules extended with one meta-rule. These predefined rules may be employed to determine whether a causal link (e.g., a rhetorical relation "cause") is identified between an EDU and a data record and/or between data records. Some of these rules are provided below, A meta-rule expresses that one can reverse any inference rule $$\frac{R(y):F}{-R(y):G} \text{ into } \frac{R(y):G}{-R(y):F}$$

An inference rule reversing process occurs whenever negation occurs in front of a leftmost "R" so that, in the general case, an inference rule 1 where i, j ∈ {0, 1}.

$$\frac{\mathcal{R}(y):C(x)}{-\mathcal{R}(y):-C(x)}$$

$$\frac{\mathcal{R}(y):C(x)}{\mathcal{R}(y):-C(-x)}$$

Reasons are interchangeable. This following rule may indicate mutual support:

$$\frac{\mathcal{R}(y):C(x) \quad \mathcal{R}(x):C(y) \quad \mathcal{R}(y):C(z)}{\mathcal{R}(x):C(z)}$$

Another rule gathers different reasons for the same conclusion within a single argument:

$$\frac{\mathcal{R}(y):C(x) \quad \mathcal{R}(z):C(x)}{\mathcal{R}(y \vee z):C(x)}$$

Cautious monotonicity means that the reason of an argument can be expanded with any premise it justifies. Cut expresses a form of minimality of the reason of an argument.

$$\frac{\mathcal{R}(y):C(z) \quad \mathcal{R}(y):C(x)}{\mathcal{R}(y \wedge z):C(x)}$$

$$\frac{\mathcal{R}(y \wedge z):C(x) \quad \mathcal{R}(y):C(z)}{\mathcal{R}(y):C(x)}$$

The two next rules describe nesting of R(.) and C(.). Exportation shows how to simplify meta-arguments and permutation shows that for some forms of meta-arguments, permutations of reasons are possible $$\frac{\mathcal{R}(y):C(\mathcal{R}(z):C(x))}{\mathcal{R}(y \wedge z):C(x)}$$

$$\frac{\mathcal{R}(y):C(\mathcal{R}(z):C(x))}{\mathcal{R}(z):C(\mathcal{R}(y):C(x))}$$

When is the smallest inference relation obeying the rules above, reflexivity, monotonicity and cut hold, meaning that with the consequence relation, manipulation of arguments by the inference rules is well-founded Let Δ be a set of (rejections of) arguments. Let α, and β be arguments.

Δα if α∈Δ (Reflexivity)

Δ∪ {α} β if Δβ (Monotonicity)

Δβ if Δ∪ {α} β and Δα (Cut)

At 212, the MMDT Generation Module 120 may perform any suitable operations for confirming the matches and/or causal links identified at 209 and/or 210. This may include iterating through each causal link, including those linking data records and those linking data records to the EDT (e.g., to EDUs/candidate phrases of the EDT). The MMDT Generation Module 120, starting with the EDT, may generate a node and an edge for each data record involved in a confirmed entity match and/or causal link to generate an MMDT. By way of example, if an entity match is identified between two data records or between a data record and an EDU generated from the corpus of text, and a node does not already exist in the EDT for one (or both) data record, a new node may be generated (e.g., for each data record) and the new node of one data record may be linked to the EDU generated from the corpus or the new node generated for the other data record, depending on the particular use case. For example, if an EDU generated from the corpus includes an entity that matches an entity found in a data record (e.g., they both include a term found in ontology 117 of FIG. 1, they both include a matching noun such as "San Francisco", etc.), and a node for the data record does not already exist, MMDT Generation Module 120 may generate a new node for the EDT and the node corresponding to the EDU may be linked to the new node using an edge associated with a rhetorical relation (e.g., "elaboration"). In some embodiments, MMDT Generation Module 120 may link entity matches via one rhetorical relation (e.g., "elaboration") while causal links may be linked in the MMDT via a different rhetorical relation (e.g., "cause").

Figure 8:
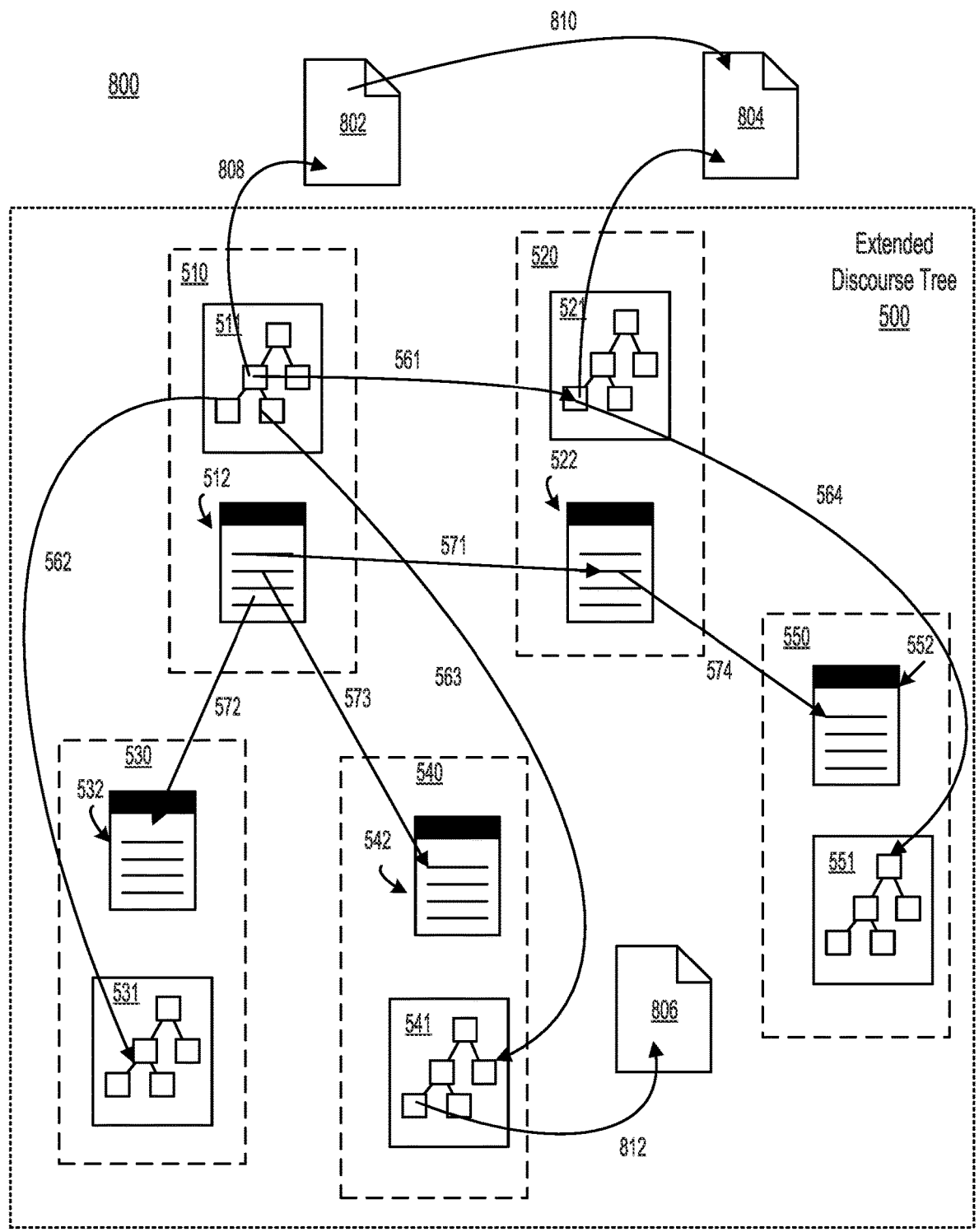
FIG. 8 depicts an example of a multi-modal discourse tree, in accordance with at least one embodiment.

FIG. 8 depicts an example of a multi-modal discourse tree 800, in accordance with at least one embodiment. FIG. 8 depicts extended discourse tree 500 of FIG. 5, with additional edge corresponding to data records 802, 804, and 806.

In addition to links between within particular discourse trees, e.g., discourse trees 511, 521, 531, 541, and 551, extended discourse tree 500 includes inter-discourse tree links 561-564 and associated inter-document links 571-574. As explained further with respect to FIG. 6, MMDT Generation Module 120 may construct discourse trees 511-515. Discourse tree 511 represents document 512, discourse tree 521 represents document 522, and so on. Extended discourse tree 500 may be built by building a discourse tree (e.g., a DT and/or a CDT) for each paragraph or document. Discourse trees 511-515 may be built from text of a corpus.

Inter-discourse tree link 561 connects discourse tree 511 and 521, inter-discourse tree link 562 connects discourse tree 521 and 531, inter-discourse tree link 563 connects discourse tree 511 and 541, and inter-discourse tree link 564 connects discourse tree 521 and 551. Based on inter-discourse tree links 561-564, MMDT Generation Module 120 creates inter-document links 571, 572, 573, and 574, which correspond to inter-discourse tree links 561, 562, 563, and 564 respectively. Inter-document links 571-574 can be used to navigate documents 512, 522, 532, 542, and 552.

MMDT Generation Module 120 determines one or more entities within a first discourse tree of the discourse trees 511-515. Examples of entities include places, things, people, or companies. MMDT Generation Module 120 then identifies the same entities present in the other discourse trees. Based on the determined entities, MMDT Generation Module 120 determines a rhetorical relationship between each matching entity.

As described above, MMDT Generation Module 120 may be configured to identify one or more entities within EDUs of a first discourse tree of the discourse trees 511-515 and a data record. For example, the MMDT Generation Module 120 may identify an entity that is referenced within discourse tree 510 and data record 802. Based on the determined entities, MMDT Generation Module 120 may generate link 808 (e.g., an edge).

In some embodiments, the MMDT Generation Module 120 may be configured to identify one or more causal links within EDUs of a first discourse tree of the discourse trees 511-515 and a data record and/or between data records. For example, using the algorithm identified above in connection with FIG. 2, the MMDT Generation Module 120 may identify a causal link between data record 802 and 804 and between discourse tree 541 (or an EDU of discourse tree 541) and data record 806. The MMDT Generation Module 120 may generate causal links 810 and 812, respectively, based on these identifications.

By using the links in extended discourse tree 500, MMDT Generation Module 120 can navigate between paragraphs of the same document or between documents of the text corpus and between data records and discourse trees. The MMDT 800 may, at least initially, not include rhetorical relations corresponding to the links 808-812.

Returning to FIG. 2, at 214, the MMDT Generation Module 120 pay perform operations for identifying rhetorical relations between the phase/data records matches/links and data record/data record matches/links identified confirmed at 212. To identify rhetorical relations between text fragments, MMDT Generation Module 120 may identify a relationship between entities by using a fictitious text fragment, or a temporary paragraph, from the respective text fragments of the original paragraph and perform coreference analysis and discourse parsing on the paragraph. In some embodiments, MMDT Generation Module 120 may utilize an ontology (e.g., the ontology 117 of FIG. 1) to identify relationships between entities based on the relationships provided in that ontology. The identified rhetorical relationships may be associated with the links 808-812 of FIG. 8.

At 216, the MMDT Generation Module 120 may perform operations for identifying the data records (e.g., the data records 808-812) as corresponding to a nucleus or a satellite of the EDT. Any suitable predefined rule set may be utilized to identify the data record as corresponding to a nucleus or satellite of the EDT (e.g., of the candidate phrase/EDU to which it is associated).

At 218, the generated MMDT may be converted to a normalized MMDT. This conversion may include generating n EDU for the data record and attached the generated EDU to the EDT according to the determination made at 216. A simplistic example is provided below in which a data record that was previously linked to a pair of text EDUs and connected with Elaboration rhetorical relation, may be added as an EDU. A rhetorical relation (Cause) may be inserted to strengthen the nucleus according to a predefined rule set. This process may be performed for each data record, until each data records is included as an EDU in the now complete MMDT.

--- elaboration - causal link - [DATA RECORD]
    TEXT: nucleus
    TEXT: satellite

--- elaboration
    cause
        DATA_RECORD: [12 ... data ... 12:30 ...]
        TEXT: nucleus
        TEXT: satellite

---

Figure 9:
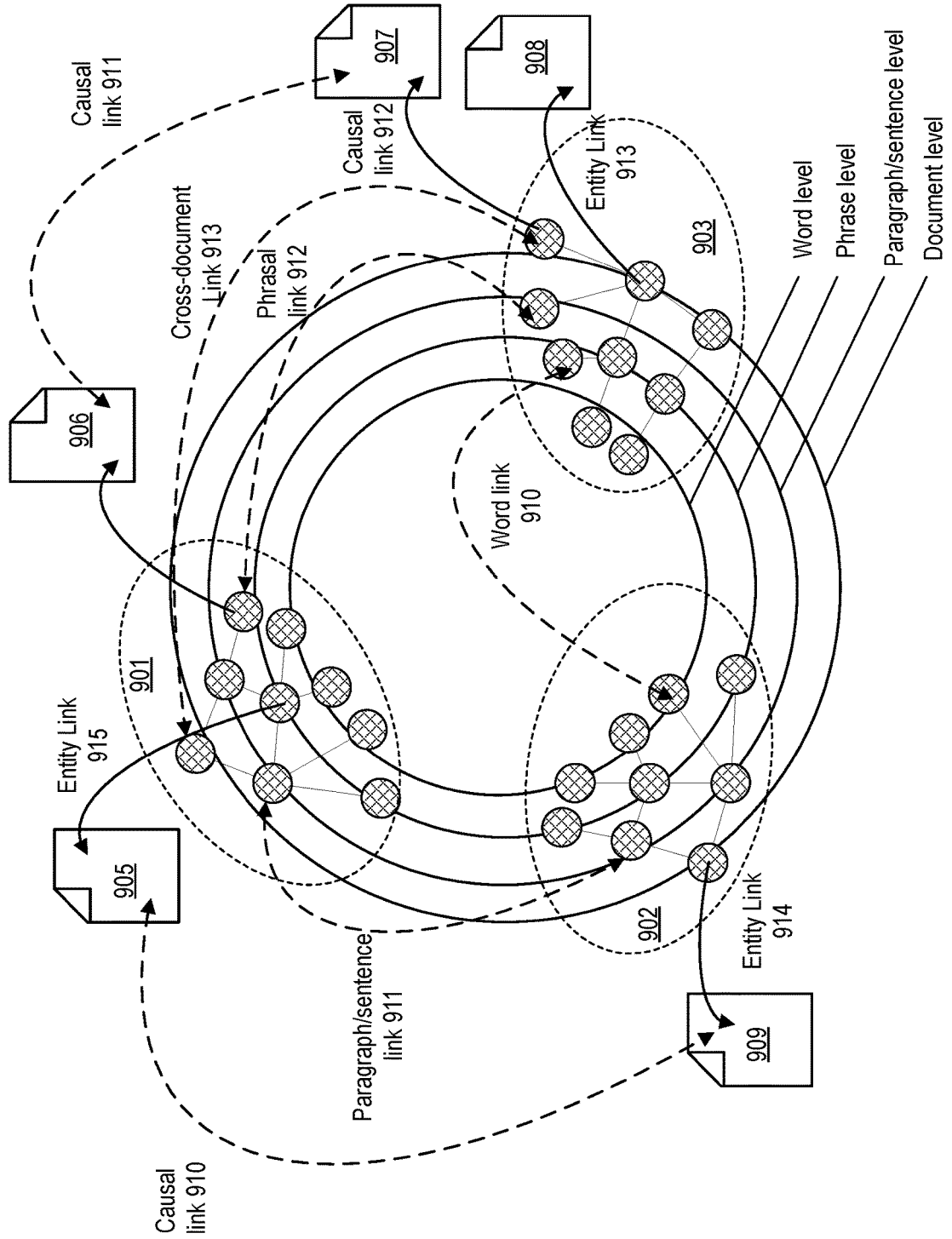
FIG. 9 depicts another view of the multi-modal discourse tree of FIG. 8, with relationships between textual units of documents at different levels of granularity and relationships between those textual units and related data records, in accordance with at least one embodiment.

FIG. 9 also depicts relationships between textual units of documents at different levels of granularity and relationships between those textual units and related data records of a MMDT, in accordance with at least one embodiment. FIG. 9 depicts MMDT 900 which includes discourse trees 901, 902, and 903, each corresponding to a separate document (e.g., an example of a DT or CDT generated using the techniques described above at FIGS. 3 and 4, respectively). FIG. 9 also depicts various inter-document links, such as word link 910 that links words in documents 902 and 903, paragraph/sentence link 911 that links paragraphs or sentences in documents 901 and 902, phrasal link 912 that links phrases in documents 901 and 903, and cross-document link 913 that links documents 901 and 903. MMDT 900 also includes data records 905-909. The MMDT 900 may include any suitable number of causal links (e.g., causal links 910-912) and/or entity links (e.g., entity links 913-915) identified in the manner described above in connection with FIG. 2. In some embodiments, each of the data records 905-909 may be included as an EDU within the discourse trees 901-903 to which they are linked. The MMDT Generation Module 120 can use links any suitable link to navigate between documents 901-903 and/or data records 905-909.

Figure 10:
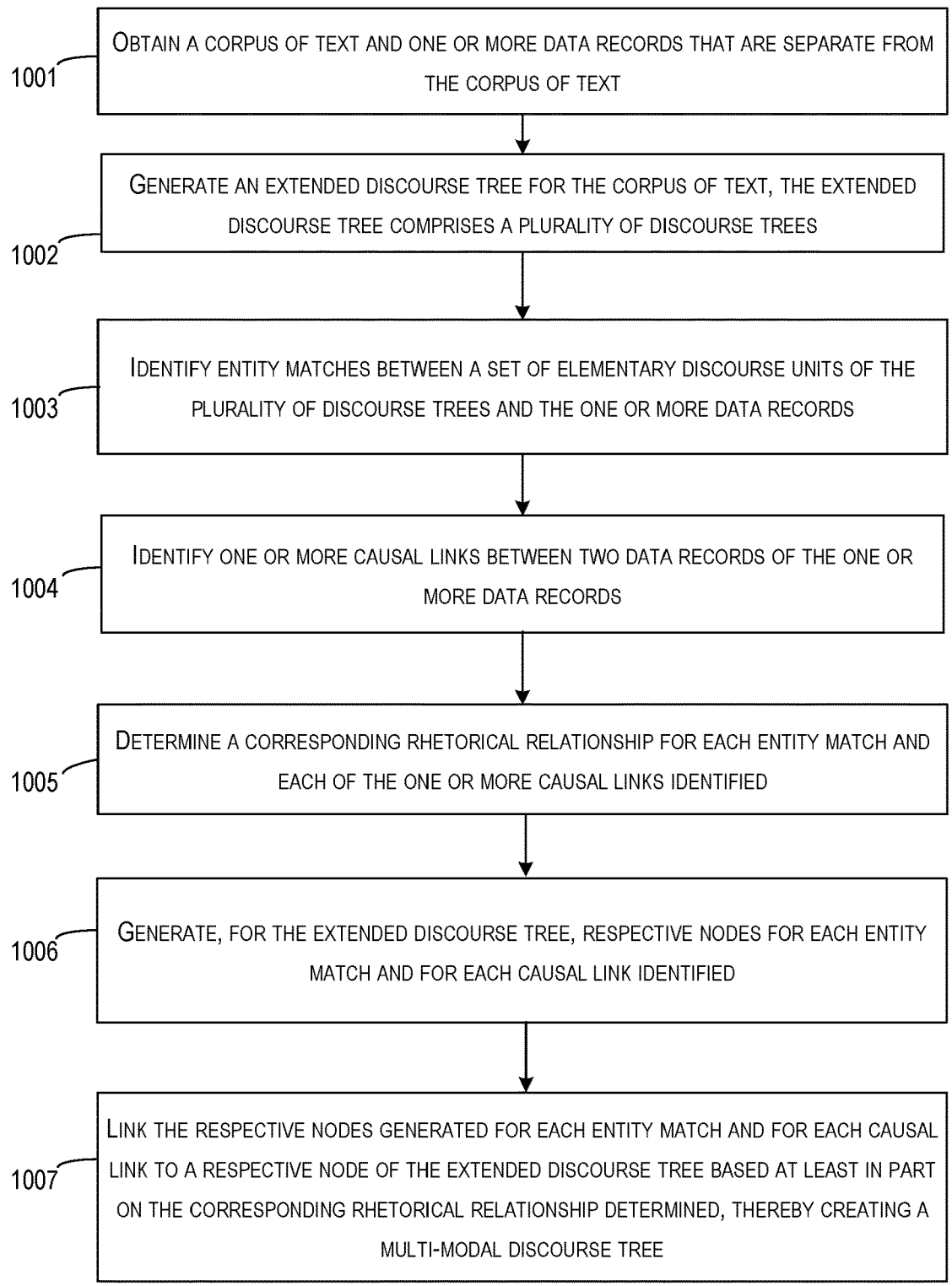
FIG. 10 depicts a flow for a method for generating a multi-modal discourse tree, in accordance with at least one embodiment.

FIG. 10 depicts a flow for a method 1000 for generating a multi-modal discourse tree, in accordance with at least one embodiment. In some embodiments, the method 1000 may be performed by the computing device 102 of FIG. 1 (e.g., application 106 of FIG. 1, the MMDT Generation Module 120 of FIG. 1). The operations of method 1000 may be performed in any suitable order. In some embodiments, the method 1000 may include more operations than those depicted in FIG. 10, or fewer operations than those depicted in FIG. 10.

The method 1000 may begin at 1001, where a corpus of text and one or more data records that are separate from the corpus of text may be obtained (e.g., from the textual data 116 and the records data store 118 of FIG. 1, respectively). The one or more data records may be obtained from any suitable source. In some embodiments, the source of the one or more data records may be different from a source of the corpus of text.

At 1002, an extended discourse tree (e.g., EDT 500 of FIGS. 5 and 8) may be generated for the corpus of text. In some embodiments, the extended discourse tree comprises a plurality of discourse trees (e.g., each an example of DT 300 of FIG. 3 or CDT 400 of FIG. 4). In some embodiments, each discourse tree comprises a plurality of nodes, where each terminal node of the discourse tree corresponds to a fragment of text (and/or a data record), each non-terminal node of the discourse tree indicates a rhetorical relationship between nodes of the discourse tree. In some embodiments, the extended discourse tree comprises additional links between the plurality of discourse trees indicating additional rhetorical relationships between nodes of respective discourse trees.

At 1003, entity matches between a set of elementary discourse units of the plurality of discourse trees and the one or more data records (and/or between elementary discourse units) may be identified. In some embodiments, the entity matches are identified by comparing a first entity identified from an elementary discourse unit to a second entity identified from a data record.

At 1004, one or more causal links may be identified. For example, a causal link identification algorithm (e.g., described in connection with FIG. 2) may be executed to identify one or more causal links between two data records of the one or more data records.

At 1005, a corresponding rhetorical relationship for each entity match and each of the one or more causal links identified. By way of example, an "elaboration" rhetorical relationship may be identified for each entity match while a "cause" rhetorical relationship may be identified for each causal link.

At 1006, respective nodes for each entity match and for each causal link identified may be generated for the extended discourse tree.

At 1007, the respective nodes generated for each entity match and for each causal link may be linked to a respective node of the extended discourse tree based at least in part on the corresponding rhetorical relationship determined, thereby creating a multi-modal discourse tree (e.g., the MMDT 800 and 900 of FIGS. 8 and 9).

In some embodiments, generating the extended discourse comprises: i) generating a first discourse tree from a first text of the corpus of text, the first discourse tree corresponding to a first portion of the first text, ii) generating a second discourse tree from a second text of the corpus of text, the second discourse tree corresponding to a second portion of the second text; and iii) responsive to determining a particular rhetorical relationship between respective elementary discourse units of the first discourse tree and the second discourse tree, linking the first discourse tree and the second discourse tree using the particular rhetorical relationship.

In some embodiments, the first discourse tree and the second discourse trees are communicative discourse trees comprising respective verb signatures generated for each elementary discourse unit of the first discourse tree and the second discourse tree.

In some embodiments, identifying the entities further comprises comparing the second entity identified from the data record and a third entity identified from a second data record, wherein an entity refers to one of (i) a person, (ii) a company, (iii) a location, (iv) a name of a document, or (v) a date or time.

In some embodiments, identifying the entity matches further comprises identifying the entity from a predefined ontology.

In some embodiments, the method 1000 may further comprise classifying subsequent input based at least in part on the multi-modal discourse tree, wherein classifying the subsequent input comprises: i) generating a training data set comprising a plurality of multi-modal discourse trees, each multi-modal discourse tree corresponding to a respective text corpus and a respective set of data records, each multi-modal discourse tree being associated with a label corresponding to a classification; ii) training a machine-learning model to classify input based at least in part on the training data set and a supervised learning algorithm; iii) generating a corresponding multi-modal discourse tree from the subsequent input, the subsequent input comprising a respective set of text and a respective set of data records; and iv) classifying the subsequent input based at least in part on providing the corresponding multi-modal discourse generated from the subsequent input to the machine-learning mode as input and receiving output from the machine-learning model indicating a classification for the subsequent input.

In some embodiments, the method 1000 further comprises navigating the corpus of text using the multi-modal discourse tree, wherein navigating the corpus of text comprises: accessing the multi-modal discourse tree; determining, from the multi-modal discourse tree a first elementary discourse unit that is responsive to a query from a user device, the first elementary discourse unit corresponding to a first node of a first discourse tree of the multi-modal discourse tree; determining, from the multi-modal discourse tree, a set of navigation options comprising at least two of: (i) a first rhetorical relationship between the first node of the first discourse tree and a second node of the first discourse tree and (ii) a second rhetorical relationship between the first node and a third node of a second discourse tree of the multi-modal discourse tree, or iii) a third rhetorical relationship between the first node of the first discourse tree and a fourth node of the multi-modal discourse tree that is associated with a corresponding data record; presenting, to the user device, at least two of: the first, second, or third rhetorical relationships; and responsive to receiving additional user input comprising a selection of the first rhetorical relationship, the second rhetorical relationship, or the third rhetorical relationship: i) presenting a second elementary discourse unit corresponding to the second node based at least in part on determining the selection corresponds to the first rhetorical relationship, ii) presenting a third elementary discourse unit corresponding to the third node based at least in part on determining the selection corresponds to the first rhetorical relationship, or iii) presenting at least a portion of the corresponding data record based at least in part on determining the selection corresponds to the third rhetorical relationship.

Exemplary Computing Systems

Figure 11:
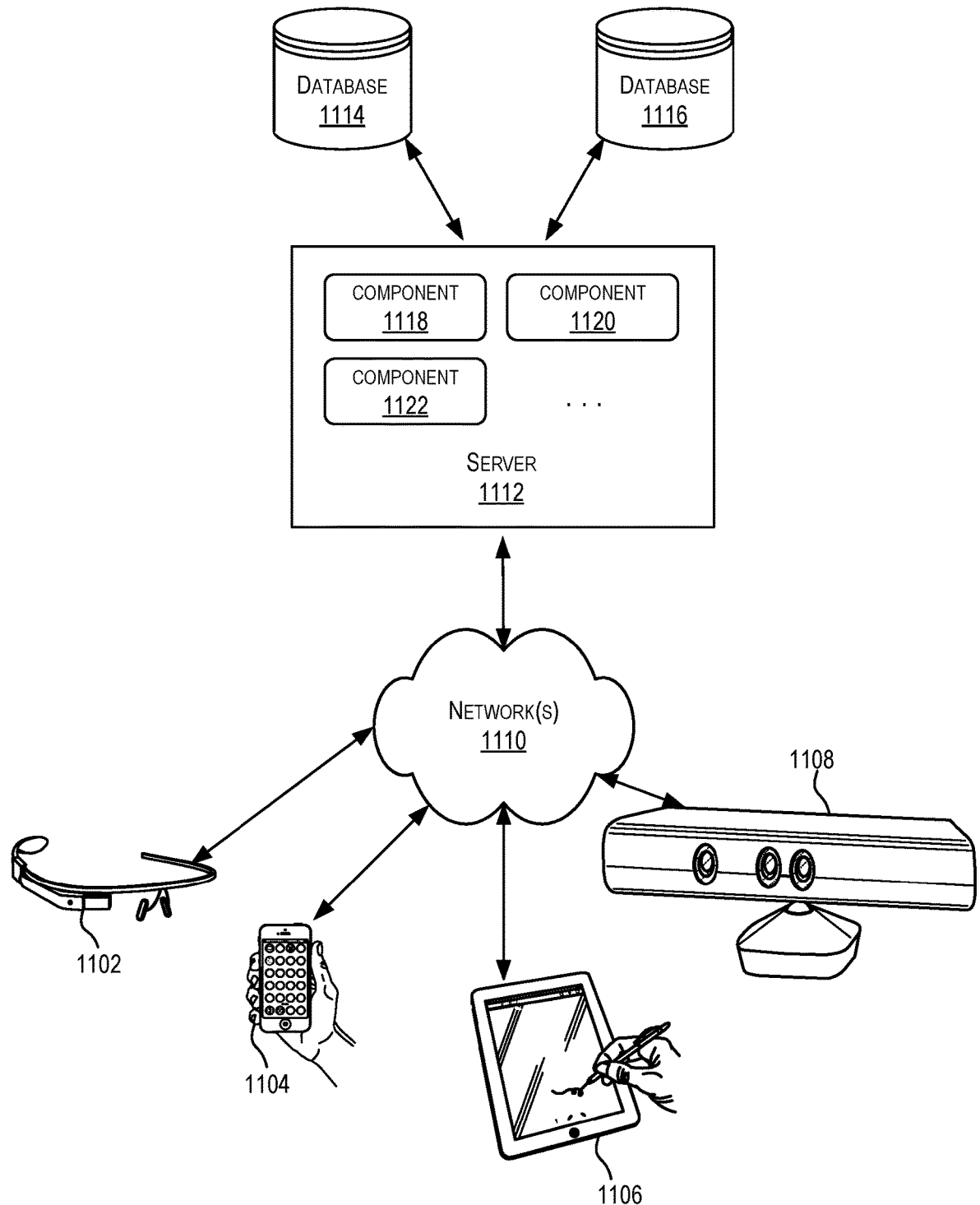
FIG. 11 depicts a simplified diagram of a distributed system for implementing one of the aspects, in accordance with at least one embodiment.

FIG. 11 depicts a simplified diagram of a distributed system 1100 for implementing one of the aspects. In the illustrated aspect, distributed system 1100 includes one or more client computing devices 1102, 1104, 1106, and 1108, which are configured to execute and operate a client application such as a web browser, proprietary client (e.g., Oracle Forms), or the like over one or more network(s) 1110. Server 1112 may be communicatively coupled with remote client computing devices 1102, 1104, 1106, and 1108 via network 1110.

In various aspects, server 1112 may be adapted to run one or more services or software applications provided by one or more of the components of the system. The services or software applications can include non-virtual and virtual environments. Virtual environments can include those used for virtual events, tradeshows, simulators, classrooms, shopping exchanges, and enterprises, whether two- or three-dimensional (3D) representations, page-based logical environments, or otherwise. These services may be offered as web-based or cloud services or under a Software as a Service (SaaS) model to the users of client computing devices 1102, 1104, 1106, and/or 1108. Users operating client computing devices 1102, 1104, 1106, and/or 1108 may in turn utilize one or more client applications to interact with server 1112 to utilize the services provided by these components.

In the configuration depicted in the figure, the software components 1118, 1120 and 1122 of distributed system 1100 are shown as being implemented on server 1112. In other aspects, one or more of the components of distributed system 1100 and/or the services provided by these components may also be implemented by one or more of the client computing devices 1102, 1104, 1106, and/or 1108. Users operating the client computing devices may then utilize one or more client applications to use the services provided by these components. These components may be implemented in hardware, firmware, software, or combinations thereof. It should be appreciated that various different system configurations are possible, which may be different from distributed system 1100. The aspect shown in the figure is thus one example of a distributed system for implementing an aspect system and is not intended to be limiting.

Client computing devices 1102, 1104, 1106, and/or 1108 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially available UNIX® or UNIX-like operating systems, including, without limitation, the variety of GNU/Linux operating systems, such as for example, Google Chrome OS. Alternatively, or in addition, client computing devices 1102, 1104, 1106, and 1108 may be any other electronic device, such as a thin-client computer, an Internet-enabled gaming system (e.g., a Microsoft Xbox gaming console with or without a Kinect® gesture input device), and/or a personal messaging device, capable of communicating over network(s) 1110.

Although exemplary distributed system 1100 is shown with four client computing devices, any number of client computing devices may be supported. Other devices, such as devices with sensors, etc., may interact with server 1112.

Network(s) 1110 in distributed system 1100 may be any type of network familiar to those skilled in the art that can support data communications using any of a variety of commercially available protocols, including without limitation TCP/IP (transmission control protocol/Internet protocol), SNA (systems network architecture), IPX (Internet packet exchange), AppleTalk, and the like. Merely by way of example, network(s) 1110 can be a local area network (LAN), such as one based on Ethernet, Token-Ring and/or the like. Network(s) 1110 can be a wide-area network and the Internet. It can include a virtual network, including, without limitation, a virtual private network (VPN), an intranet, an extranet, a public switched telephone network (PSTN), an infrared network, a wireless network (e.g., a network operating under any of the Institute of Electrical and Electronics (IEEE) 802.9 suite of protocols, Bluetooth®, and/or any other wireless protocol); and/or any combination of these and/or other networks.

Server 1112 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 1112 can include one or more virtual machines running virtual operating systems, or other computing architectures involving virtualization. One or more flexible pools of logical storage devices can be virtualized to maintain virtual storage devices for the server. Virtual networks can be controlled by server 1112 using software defined networking. In various aspects, server 1112 may be adapted to run one or more services or software applications described in the foregoing disclosure. For example, server 1112 may correspond to a server for performing processing described above according to an aspect of the present disclosure.

Server 1112 may run an operating system including any of those discussed above, as well as any commercially available server operating system. Server 1112 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include, without limitation, those commercially available from Oracle, Microsoft, Sybase, IBM (International Business Machines), and the like.

In some implementations, server 1112 may include one or more applications to analyze and consolidate data feeds and/or event updates received from users of client computing devices 1102, 1104, 1106, and 1108. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 1112 may also include one or more applications to display the data feeds and/or real-time events via one or more display devices of client computing devices 1102, 1104, 1106, and 1108.

Distributed system 1100 may also include one or more databases 1114 and 1116. Databases 1114 and 1116 may reside in a variety of locations. By way of example, one or more of databases 1114 and 1116 may reside on a non-transitory storage medium local to (and/or resident in) server 1112. Alternatively, databases 1114 and 1116 may be remote from server 1112 and in communication with server 1112 via a network-based or dedicated connection. In one set of aspects, databases 1114 and 1116 may reside in a storage-area network (SAN). Similarly, any necessary files for performing the functions attributed to server 1112 may be stored locally on server 1112 and/or remotely, as appropriate. In one set of aspects, databases 1114 and 1116 may include relational databases, such as databases provided by Oracle, that are adapted to store, update, and retrieve data in response to SQL-formatted commands.

Figure 12:
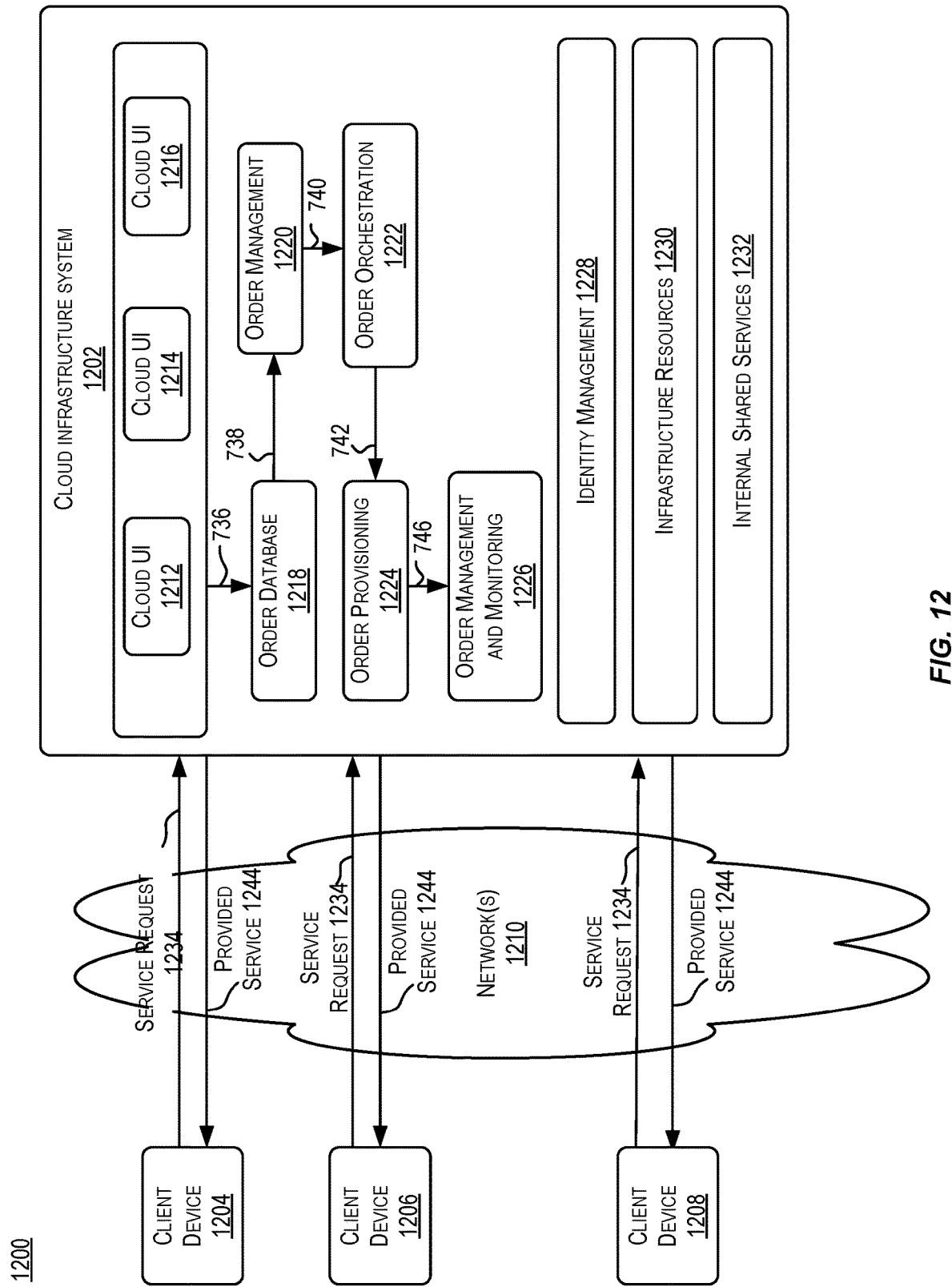
FIG. 12 is a simplified block diagram of one or more components of a system environment by which services provided by one or more components of an aspect system may be offered as cloud services, in accordance with an aspect of the present disclosure, in accordance with at least one embodiment.

FIG. 12 is a simplified block diagram of one or more components of a system environment 1200 by which services provided by one or more components of an aspect system may be offered as cloud services, in accordance with an aspect of the present disclosure. In the illustrated aspect, system environment 1200 includes one or more client computing devices 1204, 1206, and 1208 that may be used by users to interact with a cloud infrastructure system 1202 that provides cloud services. The client computing devices may be configured to operate a client application such as a web browser, a proprietary client application (e.g., Oracle Forms), or some other application, which may be used by a user of the client computing device to interact with cloud infrastructure system 1202 to use services provided by cloud infrastructure system 1202.

It should be appreciated that cloud infrastructure system 1202 depicted in the figure may have other components than those depicted. Further, the aspect shown in the figure is only one example of a cloud infrastructure system that may incorporate an aspect of the invention. In some embodiments, cloud infrastructure system 1202 may have more or fewer components than shown in the figure, may combine two or more components, or may have a different configuration or arrangement of components.

Client computing devices 1204, 1206, and 1208 may be devices similar to those described above for client computing devices 1102, 1104, 1106, and 1108.

Although exemplary system environment 1200 is shown with three client computing devices, any number of client computing devices may be supported. Other devices such as devices with sensors, etc. may interact with cloud infrastructure system 1202.

Network(s) 1210 may facilitate communications and exchange of data between clients computing devices 1204, 1206, and 1208 and cloud infrastructure system 1202. Each network may be any type of network familiar to those skilled in the art that can support data communications using any of a variety of commercially available protocols, including those described above for network(s) 1210.

Cloud infrastructure system 1202 may comprise one or more computers and/or servers that may include those described above for server 1212.

In certain aspects, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain aspects, cloud infrastructure system 1202 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

Large volumes of data, sometimes referred to as big data, can be hosted and/or manipulated by the infrastructure system on many levels and at different scales. Such data can include data sets that are so large and complex that it can be difficult to process using typical database management tools or traditional data processing applications. For example, terabytes of data may be difficult to store, retrieve, and process using personal computers or their rack-based counterparts. Such sizes of data can be difficult to work with using most current relational database management systems and desktop statistics and visualization packages. They can require massively parallel processing software running thousands of server computers, beyond the structure of commonly used software tools, to capture, curate, manage, and process the data within a tolerable elapsed time.

Extremely large data sets can be stored and manipulated by analysts and researchers to visualize large amounts of data, detect trends, and/or otherwise interact with the data. Tens, hundreds, or thousands of processors linked in parallel can act upon such data in order to present it or simulate external forces on the data or what it represents. These data sets can involve structured data, such as that organized in a database or otherwise according to a structured model, and/or unstructured data (e.g., emails, images, data blobs (binary large objects), web pages, complex event processing). By leveraging an ability of an aspect to relatively quickly focus more (or fewer) computing resources upon an objective, the cloud infrastructure system may be better available to carry out tasks on large data sets based on demand from a business, government agency, research organization, private individual, group of like-minded individuals or organizations, or other entity.

In various aspects, cloud infrastructure system 1202 may be adapted to automatically provision, manage and track a customer's subscription to services offered by cloud infrastructure system 1202. Cloud infrastructure system 1202 may provide the cloud services via different deployment models. For example, services may be provided under a public cloud model in which cloud infrastructure system 1202 is owned by an organization selling cloud services (e.g., owned by Oracle) and the services are made available to the public or different industry enterprises. As another example, services may be provided under a private cloud model in which cloud infrastructure system 1202 is operated solely for a single organization and may provide services for one or more entities within the organization. The cloud services may also be provided under a community cloud model in which cloud infrastructure system 1202 and the services provided by cloud infrastructure system 1202 are shared by several organizations in a related community. The cloud services may also be provided under a hybrid cloud model, which is a combination of two or more different models.

In some embodiments, the services provided by cloud infrastructure system 1202 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1202. Cloud infrastructure system 1202 then performs processing to provide the services in the customer's subscription order.

In some embodiments, the services provided by cloud infrastructure system 1202 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include, without limitation, services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one aspect, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain aspects, cloud infrastructure system 1202 may also include infrastructure resources 1230 for providing the resources used to provide various services to customers of the cloud infrastructure system. In one aspect, infrastructure resources 1230 may include pre-integrated and optimized combinations of hardware, such as servers, storage, and networking resources to execute the services provided by the PaaS platform and the SaaS platform.

In some embodiments, resources in cloud infrastructure system 1202 may be shared by multiple users and dynamically re-allocated per demand. Additionally, resources may be allocated to users in different time zones. For example, cloud infrastructure system 1202 may enable a first set of users in a first time zone to utilize resources of the cloud infrastructure system for a specified number of hours and then enable the re-allocation of the same resources to another set of users located in a different time zone, thereby maximizing the utilization of resources.

In certain aspects, a number of internal shared services 1232 may be provided that are shared by different components or modules of cloud infrastructure system 1202 and by the services provided by cloud infrastructure system 1202. These internal shared services may include, without limitation, a security and identity service, an integration service, an enterprise repository service, an enterprise manager service, a virus scanning and whitelist service, a high availability, backup and recovery service, service for enabling cloud support, an email service, a notification service, a file transfer service, and the like.

In certain aspects, cloud infrastructure system 1202 may provide comprehensive management of cloud services (e.g., SaaS, PaaS, and IaaS services) in the cloud infrastructure system. In one aspect, cloud management functionality may include capabilities for provisioning, managing and tracking a customer's subscription received by cloud infrastructure system 1202, and the like.

In one aspect, as depicted in the figure, cloud management functionality may be provided by one or more modules, such as an order management module 1220, an order orchestration module 1222, an order provisioning module 1211, an order management and monitoring module 1210, and an identity management module 1228. These modules may include or be provided using one or more computers and/or servers, which may be general purpose computers, specialized server computers, server farms, server clusters, or any other appropriate arrangement and/or combination.

In exemplary operation 1234, a customer using a client device, such as client computing device 1204, 1206 or 1208, may interact with cloud infrastructure system 1202 by requesting one or more services provided by cloud infrastructure system 1202 and placing an order for a subscription for one or more services offered by cloud infrastructure system 1202. In certain aspects, the customer may access a cloud User Interface (UI), cloud UI 1212, cloud UI 1214 and/or cloud UI 1216 and place a subscription order via these UIs. The order information received by cloud infrastructure system 1202 in response to the customer placing an order may include information identifying the customer and one or more services offered by the cloud infrastructure system 1202 in which the customer intends to subscribe.

After an order has been placed by the customer, the order information is received via the cloud UIs, 1210, 1214 and/or 1216.

At operation 1236, the order is stored in order database 1218. Order database 1218 can be one of several databases operated by cloud infrastructure system 1202 and operated in conjunction with other system elements.

At operation 1238, the order information is forwarded to an order management module 1220. In some instances, order management module 1220 may be configured to perform billing and accounting functions related to the order, such as verifying the order, and upon verification, booking the order.

At operation 1240, information regarding the order is communicated to an order orchestration module 1222. Order orchestration module 1222 may utilize the order information to orchestrate the provisioning of services and resources for the order placed by the customer. In some instances, order orchestration module 1222 may orchestrate the provisioning of resources to support the subscribed services using the services of order provisioning module 1211.

In certain aspects, order orchestration module 1222 enables the management of business processes associated with each order and applies business logic to determine whether an order should proceed to provisioning. At operation 1242, upon receiving an order for a new subscription, order orchestration module 1222 sends a request to order provisioning module 1211 to allocate resources and configure those resources needed to fulfill the subscription order. Order provisioning module 1211 enables the allocation of resources for the services ordered by the customer. Order provisioning module 1211 provides a level of abstraction between the cloud services provided by cloud infrastructure system 1202 and the physical implementation layer that is used to provision the resources for providing the requested services. Order orchestration module 1222 may thus be isolated from implementation details, such as whether or not services and resources are actually provisioned on the fly or pre-provisioned and only allocated/assigned upon request.

At operation 1244, once the services and resources are provisioned, a notification of the provided service may be sent to customers on client computing devices 1204, 1206 and/or 1208 by order provisioning module 1211 of cloud infrastructure system 1202.

At operation 1246, the customer's subscription order may be managed and tracked by an order management and monitoring module 1210. In some instances, order management and monitoring module 1210 may be configured to collect usage statistics for the services in the subscription order, such as the amount of storage used, the amount data transferred, the number of users, and the amount of system up time and system down time.

In certain aspects, cloud infrastructure system 1202 may include an identity management module 1228. Identity management module 1228 may be configured to provide identity services, such as access management and authorization services in cloud infrastructure system 1202. In some embodiments, identity management module 1228 may control information about customers who wish to utilize the services provided by cloud infrastructure system 1202. Such information can include information that authenticates the identities of such customers and information that describes which actions those customers are authorized to perform relative to various system resources (e.g., files, directories, applications, communication ports, memory segments, etc.). Identity management module 1228 may also include the management of descriptive information about each customer and about how and by whom that descriptive information can be accessed and modified.

Figure 13:
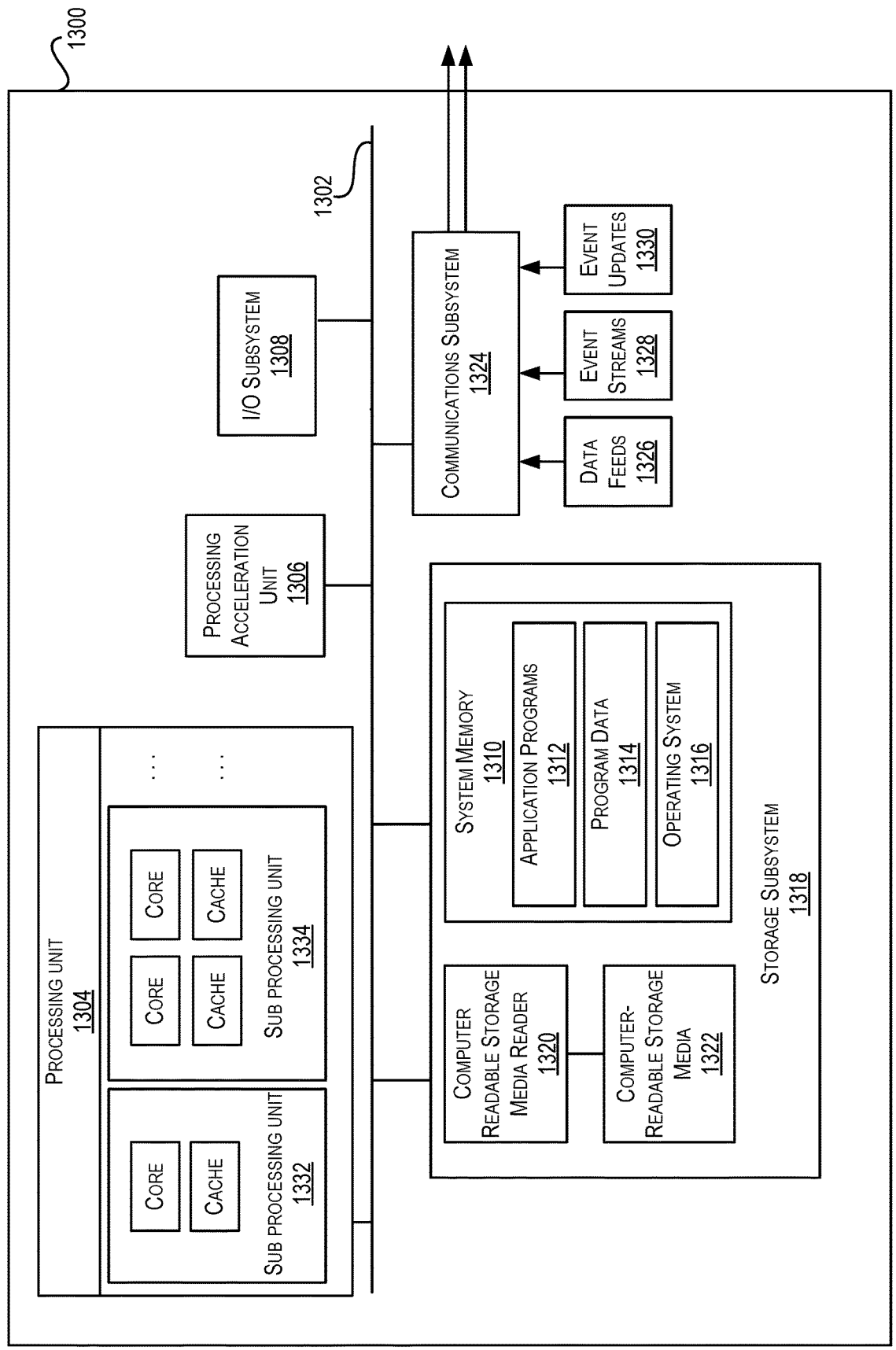
FIG. 13 illustrates an exemplary computing subsystem, in which various aspects may be implemented, in accordance with at least one embodiment.

FIG. 13 illustrates an exemplary computing subsystem 1300, in which various aspects may be implemented. The computing subsystem 1300 may be used to implement any of the computing subsystems described above. As shown in the figure, computing subsystem 1300 includes a processing unit 1304 that communicates with a number of peripheral subsystems via a bus subsystem 1302. These peripheral subsystems may include a processing acceleration unit 1306, an I/O subsystem 1308, a storage subsystem 1318 and a communications subsystem 1311. Storage subsystem 1318 includes tangible computer-readable storage media 1309 and a system memory 1310.

Bus subsystem 1302 provides a mechanism for letting the various components and subsystems of computing subsystem 1300 communicate with each other as intended. Although bus subsystem 1302 is shown schematically as a single bus, alternative aspects of the bus subsystem may utilize multiple buses. Bus subsystem 1302 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1186.1 standard.

Processing unit 1304, which can be implemented as one or more integrated circuits (e.g., a conventional microprocessor or microcontroller), controls the operation of computing subsystem 1300. One or more processors may be included in processing unit 1304. These processors may include single-core or multicore processors. In certain aspects, processing unit 1304 may be implemented as one or more independent processing units 1332 and/or 1334 with single or multicore processors included in each processing unit. In other aspects, processing unit 1304 may also be implemented as a quad-core processing unit formed by integrating two dual-core processors into a single chip.

In various aspects, processing unit 1304 can execute a variety of programs in response to program code and can maintain multiple concurrently executing programs or processes. At any given time, some or all of the program code to be executed can be resident in processing unit(s) 1304 and/or in storage subsystem 1318. Through suitable programming, processing unit(s) 1304 can provide various functionalities described above. Computing subsystem 1300 may additionally include a processing acceleration unit 1306, which can include a digital signal processor (DSP), a special-purpose processor, and/or the like.

I/O subsystem 1308 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computing subsystem 1300 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computing subsystem 1300 may comprise a storage subsystem 1318 that comprises software elements, shown as being currently located within a system memory 1310. System memory 1310 may store program instructions that are loadable and executable on processing unit 1304, as well as data generated during the execution of these programs.

Depending on the configuration and type of computing subsystem 1300, system memory 1310 may be volatile (such as random-access memory (RAM)) and/or non-volatile (such as read-only memory (ROM), flash memory, etc.) The RAM typically contains data and/or program modules that are immediately accessible to and/or presently being operated and executed by processing unit 1304. In some implementations, system memory 1310 may include multiple different types of memory, such as static random-access memory (SRAM) or dynamic random access memory (DRAM). In some implementations, a basic input/output system (BIOS), containing the basic routines that help to transfer information between elements within computing subsystem 1300, such as during start-up, may typically be stored in the ROM. By way of example, and not limitation, system memory 1310 also illustrates application programs 1312, which may include client applications, Web browsers, mid-tier applications, relational database management systems (RDBMS), etc., program data 1314, and an operating system 1316. By way of example, operating system 1316 may include various versions of Microsoft Windows®, Apple Macintosh®, and/or Linux operating systems, a variety of commercially available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1318 may also provide a tangible computer-readable storage medium for storing the basic programming and data constructs that provide the functionality of some aspects. Software (programs, code modules, instructions) that when executed by a processor, provides the functionality described above and may be stored in storage subsystem 1318. These software modules or instructions may be executed by processing unit 1304. Storage subsystem 1318 may also provide a repository for storing data used in accordance with the present invention.

Storage subsystem 1318 may also include a computer-readable storage media reader 1320 that can further be connected to computer-readable storage media 1309. Together and optionally, in combination with system memory 1310, computer-readable storage media 1309 may comprehensively represent remote, local, fixed, and/or removable storage devices plus storage media for temporarily and/or more permanently containing, storing, transmitting, and retrieving computer-readable information.

Computer-readable storage media 1309 containing code, or portions of code, can also include any appropriate media known or used in the art, including storage media and communication media, such as, but not limited to, volatile and non-volatile, removable and non-removable media implemented in any method or technology for storage and/or transmission of information. This can include tangible, non-transitory computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. When specified, this can also include nontangible, transitory computer-readable media, such as data signals, data transmissions, or any other medium which can be used to transmit the desired information, and which can be accessed by computing subsystem 1300.

By way of example, computer-readable storage media 1309 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1309 may include, but is not limited to, Zip® drives, flash memory cards, universal serial bus (USB) flash drives, secure digital (SD) cards, DVD disks, digital video tape, and the like. Computer-readable storage media 1309 may also include, solid-state drives (SSD) based on non-volatile memory such as flash-memory based SSDs, enterprise flash drives, solid state ROM, and the like, SSDs based on volatile memory such as solid-state RAM, dynamic RAM, static RAM, DRAM-based SSDs, magnetoresistive RAM (MRAM) SSDs, and hybrid SSDs that use a combination of DRAM and flash memory-based SSDs. The disk drives and their associated computer-readable media may provide non-volatile storage of computer-readable instructions, data structures, program modules, and other data for computing subsystem 1300.

Communications subsystem 1311 provides an interface to other computing subsystems and networks. Communications subsystem 1311 serves as an interface for receiving data from and transmitting data to other systems from computing subsystem 1300. For example, communications subsystem 1311 may enable computing subsystem 1300 to connect to one or more devices via the Internet. In some embodiments, communications subsystem 1311 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 902.9 family standards, or other mobile communication technologies, or any combination thereof), global positioning system (GPS) receiver components, and/or other components). In some embodiments, communications subsystem 1311 can provide wired network connectivity (e.g., Ethernet) in addition to or instead of a wireless interface.

In some embodiments, communications subsystem 1311 may also receive input communication in the form of structured and/or unstructured data feeds 1326, event streams 1328, event updates 1330, and the like on behalf of one or more users who may use computing subsystem 1300.

By way of example, communications subsystem 1311 may be configured to receive unstructured data feeds 1326 in real-time from users of social media networks and/or other communication services such as Twitter® feeds, Facebook® updates, web feeds such as Rich Site Summary (RSS) feeds, and/or real-time updates from one or more third party information sources.

Additionally, communications subsystem 1311 may also be configured to receive data in the form of continuous data streams, which may include event streams 1328 of real-time events and/or event updates 1330, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 1311 may also be configured to output the structured and/or unstructured data feeds 1326, event streams 1328, event updates 1330, and the like to one or more databases that may be in communication with one or more streaming data source computers coupled to computing subsystem 1300.

Computing subsystem 1300 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computing subsystem 1300 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various aspects. Various aspects of the present disclosure may be implemented by using a computer program product, comprising computer program/instructions which, when executed by a processor, cause the processor to perform any of the methods disclosed herein.

In the foregoing specification, aspects of the invention are described with reference to specific aspects thereof, but those skilled in the art will recognize that the invention is not limited thereto. Various features and aspects of the above-described invention may be used individually or jointly. Further, aspects can be utilized in any number of environments and applications beyond those described herein without departing from the broader spirit and scope of the specification. The specification and drawings are, accordingly, to be regarded as illustrative rather than restrictive.

What is claimed is:

1. A computer-implemented method for generating a multi-modal discourse tree, the computer-implemented method comprising:
    obtaining a corpus of text and one or more data records that are separate from the corpus of text;
    generating an extended discourse tree for the corpus of text, the extended discourse tree comprises a plurality of discourse trees, each discourse tree comprising a plurality of nodes, each terminal node of the discourse tree corresponding to a fragment of text, each non-terminal node of the discourse tree indicating a rhetorical relationship between nodes of the discourse tree, the extended discourse tree comprising additional links between the plurality of discourse trees indicating additional rhetorical relationships between nodes of respective discourse trees;
    identifying entity matches between a set of elementary discourse units of the plurality of discourse trees and the one or more data records, the entity matches being identified by comparing a first entity identified from an elementary discourse unit to a second entity identified from a data record of the one or more data records;
    identifying one or more causal links between two data records of the one or more data records;
    determining a corresponding rhetorical relationship for each entity match and each of the one or more causal links identified;
    generating, for the extended discourse tree, respective nodes for each entity match and for each causal link identified; and
    linking the respective nodes generated for each entity match and for each causal link to a respective node of the extended discourse tree based at least in part on the corresponding rhetorical relationship determined, thereby creating the multi-modal discourse tree.

2. The computer-implemented method of claim 1, wherein generating the extended discourse tree comprises:
    generating a first discourse tree from a first text of the corpus of text, the first discourse tree corresponding to a first portion of the first text;

generating a second discourse tree from a second text of the corpus of text, the second discourse tree corresponding to a second portion of the second text; and responsive to determining a particular rhetorical relationship between respective elementary discourse units of the first discourse tree and the second discourse tree, linking the first discourse tree and the second discourse tree using the particular rhetorical relationship.

3. The computer-implemented method of claim 2, wherein the first discourse tree and the second discourse tree are communicative discourse trees comprising respective verb signatures generated for each elementary discourse unit of the first discourse tree and the second discourse tree.

4. The computer-implemented method of claim 2, wherein identifying the entity matches further comprises comparing the second entity identified from of the one or more data records and a third entity identified from a second data record of the one or more data records, wherein an entity refers to one of (i) a person, (ii) a company, (iii) a location, (iv) a name of a document, (v) a date or time, (vi) a transaction, or (vii) an activity.

5. The computer-implemented method of claim 1, wherein the entity matches further comprise identifying the entity from a predefined ontology.

6. The computer-implemented method of claim 1, further comprising classifying subsequent input based at least in part on the multi-modal discourse tree, wherein classifying the subsequent input comprises:
 generating a training data set comprising a plurality of multi-modal discourse trees, each multi-modal discourse tree corresponding to a particular text corpus and a respective set of data records, each multi-modal discourse tree being associated with a label corresponding to a classification;
 training a machine-learning model to classify input based at least in part on the training data set and a supervised learning algorithm;
 generating a corresponding multi-modal discourse tree from the subsequent input, the subsequent input comprising a corresponding text corpus and a corresponding set of data records; and
 classifying the subsequent input based at least in part on providing the corresponding multi-modal discourse tree generated from the subsequent input to the machine-learning model as input and receiving output from the machine-learning model indicating a classification label for the subsequent input.

7. The computer-implemented method of claim 1, further comprising navigating the corpus of text using the multi-modal discourse tree, wherein navigating the corpus of text comprises:
 accessing the multi-modal discourse tree;
 determining, from the multi-modal discourse tree a first elementary discourse unit that is responsive to a query from a user device, the first elementary discourse unit corresponding to a first node of a first discourse tree of the multi-modal discourse tree;
 determining, from the multi-modal discourse tree, a set of navigation options comprising at least two of: (i) a first rhetorical relationship between the first node of the first discourse tree and a second node of the first discourse tree and (ii) a second rhetorical relationship between the first node and a third node of a second discourse tree of the multi-modal discourse tree, or iii) a third rhetorical relationship between the first node of the first discourse tree and a fourth node of the multi-modal discourse tree that is associated with a corresponding data record;
 presenting, to the user device, at least two of: the first, second, or third rhetorical relationships; and
 responsive to receiving additional user input comprising a selection of the first rhetorical relationship, the second rhetorical relationship, or the third rhetorical relationship:
  presenting a second elementary discourse unit corresponding to the second node based at least in part on determining the selection corresponds to the first rhetorical relationship;
  presenting a third elementary discourse unit corresponding to the third node based at least in part on determining the selection corresponds to the first rhetorical relationship; or
  presenting at least a portion of the corresponding data record based at least in part on determining the selection corresponds to the third rhetorical relationship.

8. A computing device, comprising:
 one or more processors; and
 one or more memories storing computer-executable instructions for generating a multi-modal discourse tree that, when executed by the one or more processors, cause the computing device to:
  obtain a corpus of text and one or more data records that are separate from the corpus of text;
  generate an extended discourse tree for the corpus of text, the extended discourse tree comprises a plurality of discourse trees, each discourse tree comprising a plurality of nodes, each terminal node of the discourse tree corresponding to a fragment of text, each non-terminal node of the discourse tree indicating a rhetorical relationship between nodes of the discourse tree, the extended discourse tree comprising additional links between the plurality of discourse trees indicating additional rhetorical relationships between nodes of respective discourse trees;
  identify entity matches between a set of elementary discourse units of the plurality of discourse trees and the one or more data records, the entity matches being identified by comparing a first entity identified from an elementary discourse unit to a second entity identified from a data record of the one or more data records;
  identify one or more causal links between two data records of the one or more data records;
  determine a corresponding rhetorical relationship for each entity match and each of the one or more causal links identified;
  generate, for the extended discourse tree, respective nodes for each entity match and for each causal link identified; and
  link the respective nodes generated for each entity match and for each causal link to a respective node of the extended discourse tree based at least in part on the corresponding rhetorical relationship determined, thereby creating the multi-modal discourse tree.

9. The computing device of claim 8, wherein performing operations to generate the extended discourse tree further causes the computing device to:
 generate a first discourse tree from a first text of the corpus of text, the first discourse tree corresponding to a first portion of the first text;

generate a second discourse tree from a second text of the corpus of text, the second discourse tree corresponding to a second portion of the second text; and responsive to determining a particular rhetorical relationship between respective elementary discourse units of the first discourse tree and the second discourse tree, generate a corresponding link between the first discourse tree and the second discourse tree using the rhetorical relationship.

10. The computing device of claim 9, wherein the first discourse tree and the second discourse tree are communicative discourse trees comprising respective verb signatures generated for each elementary discourse unit of the first discourse tree and the second discourse tree.

11. The computing device of claim 8, wherein identifying the entity matches further causes the computing device to compare the second entity identified from the data record of the one or more data records and a third entity identified from a second data record of the one or more data records, wherein an entity refers to one of (i) a person, (ii) a company, (iii) a location, (iv) a name of a document, or (v) a date or time.

12. The computing device of claim 8, wherein the entity matches further comprise identifying the entity from a predefined ontology.

13. The computing device of claim 8, wherein the computing device classifies subsequent input based at least in part on the multi-modal discourse tree, and wherein classifying the subsequent input causes the computing device to:
generate a training data set comprising a plurality of multi-modal discourse trees, each multi-modal discourse tree corresponding to a particular text corpus and a respective set of data records, each multi-modal discourse tree being associated with a label corresponding to a classification;
train a machine-learning model to classify input based at least in part on the training data set and a supervised learning algorithm;
generate a corresponding multi-modal discourse tree from the subsequent input, the subsequent input comprising a corresponding text corpus and a corresponding set of data records; and
classify the subsequent input based at least in part on providing the corresponding multi-modal discourse tree generated from the subsequent input to the machine-learning mode as input and receiving output from the machine-learning model indicating a classification label for the subsequent input.

14. The computing device of claim 8, wherein the computing device navigates the corpus of text using the multi-modal discourse tree, wherein navigating the corpus of text further comprises:
accessing the multi-modal discourse tree;
determining, from the multi-modal discourse tree a first elementary discourse unit that is responsive to a query from a user device, the first elementary discourse unit corresponding to a first node of a first discourse tree of the multi-modal discourse tree;
determining, from the multi-modal discourse tree, a set of navigation options comprising at least two of: (i) a first rhetorical relationship between the first node of the first discourse tree and a second node of the first discourse tree and (ii) a second rhetorical relationship between the first node and a third node of a second discourse tree of the multi-modal discourse tree, or iii) a third rhetorical relationship between the first node of the first discourse tree and a fourth node of the multi-modal discourse tree that is associated with a corresponding data record;
presenting, to the user device, at least two of: the first, second, or third rhetorical relationships; and
responsive to receiving additional user input comprising a selection of the first rhetorical relationship, the second rhetorical relationship, or the third rhetorical relationship:
presenting a second elementary discourse unit corresponding to the second node based at least in part on determining the selection corresponds to the first rhetorical relationship;
presenting a third elementary discourse unit corresponding to the third node based at least in part on determining the selection corresponds to the first rhetorical relationship; or
presenting at least a portion of the corresponding data record based at least in part on determining the selection corresponds to the third rhetorical relationship.

15. A non-transitory computer readable storage medium storing instructions for generating a multi-modal discourse tree, that, when executed by one or more processors of a computing device, cause the computing device to:
obtain a corpus of text and one or more data records that are separate from the corpus of text;
generate an extended discourse tree for the corpus of text, the extended discourse tree comprises a plurality of discourse trees, each discourse tree comprising a plurality of nodes, each terminal node of the discourse tree corresponding to a fragment of text, each non-terminal node of the discourse tree indicating a rhetorical relationship between nodes of the discourse tree, the extended discourse tree comprising additional links between the plurality of discourse trees indicating additional rhetorical relationships between nodes of respective discourse trees;
identify entity matches between a set of elementary discourse units of the plurality of discourse trees and the one or more data records, the entity matches being identified by comparing a first entity identified from an elementary discourse unit to a second entity identified from a data record of the one or more data records;
identify one or more causal links between two data records of the one or more data records;
determine a corresponding rhetorical relationship for each entity match and each of the one or more causal links identified;
generate, for the extended discourse tree, respective nodes for each entity match and for each causal link identified; and
link the respective nodes generated for each entity match and for each causal link to a respective node of the extended discourse tree based at least in part on the corresponding rhetorical relationship determined, thereby creating the multi-modal discourse tree.

16. The non-transitory computer readable storage medium of claim 15, wherein performing operations to generate the extended discourse tree further causes the computing device to:
generate a first discourse tree from a first text of the corpus of text, the first discourse tree corresponding to a first portion of the first text;
generate a second discourse tree from a second text of the corpus of text, the second discourse tree corresponding to a second portion of the second text; and responsive to determining a particular rhetorical relationship between respective elementary discourse units of the first discourse tree and the second discourse tree, generate a corresponding link between the first discourse tree and the second discourse tree using the rhetorical relationship.

17. The non-transitory computer readable storage medium of claim 16, wherein the first discourse tree and the second discourse tree are communicative discourse trees comprising respective verb signatures generated for each elementary discourse unit of the first discourse tree and the second discourse tree.

18. The non-transitory computer readable storage medium of claim 15, wherein identifying the entity matches further causes the computing device to compare the second entity identified from the data record of the one or more data records and a third entity identified from a second data record of the one or more data records, wherein an entity refers to one of (i) a person, (ii) a company, (iii) a location, (iv) a name of a document, or (v) a date or time.

19. The non-transitory computer readable storage medium of claim 15, wherein the computing device classifies subsequent input based at least in part on the multi-modal discourse tree, and wherein classifying the subsequent input causes the computing device to:
   generate a training data set comprising a plurality of multi-modal discourse trees, each multi-modal discourse tree corresponding to a particular text corpus and a respective set of data records, each multi-modal discourse tree being associated with a label corresponding to a classification;
   train a machine-learning model to classify input based at least in part on the training data set and a supervised learning algorithm;
   generate a corresponding multi-modal discourse tree from the subsequent input, the subsequent input comprising a corresponding text corpus and a corresponding set of data records; and
   classify the subsequent input based at least in part on providing the corresponding multi-modal discourse tree generated from the subsequent input to the machine-learning mode as input and receiving output from the machine-learning model indicating a classification label for the subsequent input.

20. The non-transitory computer readable storage medium of claim 15, wherein the computing device navigates the corpus of text using the multi-modal discourse tree, wherein navigating the corpus of text further comprises:
   accessing the multi-modal discourse tree;
   determining, from the multi-modal discourse tree a first elementary discourse unit that is responsive to a query from a user device, the first elementary discourse unit corresponding to a first node of a first discourse tree of the multi-modal discourse tree;
   determining, from the multi-modal discourse tree, a set of navigation options comprising at least two of: (i) a first rhetorical relationship between the first node of the first discourse tree and a second node of the first discourse tree and (ii) a second rhetorical relationship between the first node and a third node of a second discourse tree of the multi-modal discourse tree, or iii) a third rhetorical relationship between the first node of the first discourse tree and a fourth node of the multi-modal discourse tree that is associated with a corresponding data record;
   presenting, to the user device, at least two of: the first, second, or third rhetorical relationships; and
   responsive to receiving additional user input comprising a selection of the first rhetorical relationship, the second rhetorical relationship, or the third rhetorical relationship:
      presenting a second elementary discourse unit corresponding to the second node based at least in part on determining the selection corresponds to the first rhetorical relationship;
      presenting a third elementary discourse unit corresponding to the third node based at least in part on determining the selection corresponds to the first rhetorical relationship; or
      presenting at least a portion of the corresponding data record based at least in part on determining the selection corresponds to the third rhetorical relationship.

* * * * *